United States Patent
Peyfuss et al.

(10) Patent No.: US 11,961,418 B2
(45) Date of Patent: Apr. 16, 2024

(54) DYNAMICALLY PROVIDING VIRTUAL REALITY (VR) COACHING USING REAL-TIME FEEDBACK LOOPS

(71) Applicant: Bank of America Corporation, Charlotte, NC (US)

(72) Inventors: Regina Peyfuss, Denver, CO (US); Michael Emil Ogrinz, Easton, CT (US); Jeremiah W. Fellows, Centennial, CO (US); Susan E. Teague Rector, Denver, CO (US); Gerard P. Gay, Seattle, WA (US); Allison D. Baker, Charlotte, NC (US); Mark A. Odiorne, Waxhaw, NC (US); Siddhesh V. Wadikar, Denver, CO (US)

(73) Assignee: Bank of America Corporation, Charlotte, NC (US)

( * ) Notice: Subject to any disclaimer, the term of this patent is extended or adjusted under 35 U.S.C. 154(b) by 459 days.

(21) Appl. No.: 17/183,525

(22) Filed: Feb. 24, 2021

(65) Prior Publication Data
US 2022/0270506 A1    Aug. 25, 2022

(51) Int. Cl.
*G09B 9/00*  (2006.01)
*G06N 20/00*  (2019.01)

(52) U.S. Cl.
CPC ............... *G09B 9/00* (2013.01); *G06N 20/00* (2019.01)

(58) Field of Classification Search
CPC .................................. G06N 20/00; G09B 9/00
See application file for complete search history.

(56) References Cited

U.S. PATENT DOCUMENTS

| | | |
|---|---|---|
| 6,183,259 B1 | 2/2001 | Macri et al. |
| 6,736,642 B2 | 5/2004 | Bajer et al. |
| 7,038,855 B2 | 5/2006 | French et al. |
| 7,155,158 B1 | 12/2006 | Iuppa et al. |
| 10,311,742 B2 | 6/2019 | Falash et al. |
| 2005/0250083 A1 | 11/2005 | Macri et al. |
| 2007/0202484 A1 | 8/2007 | Toombs et al. |
| 2008/0241810 A1 | 10/2008 | Flores |
| 2008/0254426 A1* | 10/2008 | Cohen ............... G09B 5/00 434/308 |
| 2011/0047528 A1* | 2/2011 | Blanchard .......... G06Q 10/06 717/113 |

(Continued)

*Primary Examiner* — Jay Trent Liddle
*Assistant Examiner* — Alyssa N Brandley
(74) *Attorney, Agent, or Firm* — Banner & Witcoff, Ltd.

(57) ABSTRACT

Aspects of the disclosure relate to a dynamic virtual reality (VR) coaching computing platform. The dynamic VR coaching computing platform may configure a VR coaching model based on model training data. The dynamic VR coaching computing platform may use the VR coaching model and a user profile to select a plurality of VR modules. The dynamic VR coaching computing platform may configure a first VR module of the plurality of VR modules based on one or more user selections. The dynamic VR coaching computing platform may receive real-time feedback during execution of the first VR module. The dynamic VR coaching computing platform may select a second plurality of VR modules based on the first real-time feedback. The dynamic VR coaching computing platform may configure a second VR module of the second plurality of VR modules based on user selections.

15 Claims, 21 Drawing Sheets

(56) References Cited

U.S. PATENT DOCUMENTS

| | | | |
|---|---|---|---|
| 2013/0171594 A1* | 7/2013 | Gorman | G09B 5/00 |
| | | | 434/219 |
| 2013/0203026 A1* | 8/2013 | Sundaresh | G09B 7/00 |
| | | | 434/219 |
| 2017/0018200 A1 | 1/2017 | Nemire et al. | |
| 2021/0005099 A1* | 1/2021 | Agley | G06N 7/01 |
| 2021/0005324 A1* | 1/2021 | Bostic | G16H 50/20 |
| 2021/0020060 A1* | 1/2021 | Hirsch | G06F 3/011 |
| 2022/0327794 A1* | 10/2022 | Gates | G16H 20/70 |

\* cited by examiner

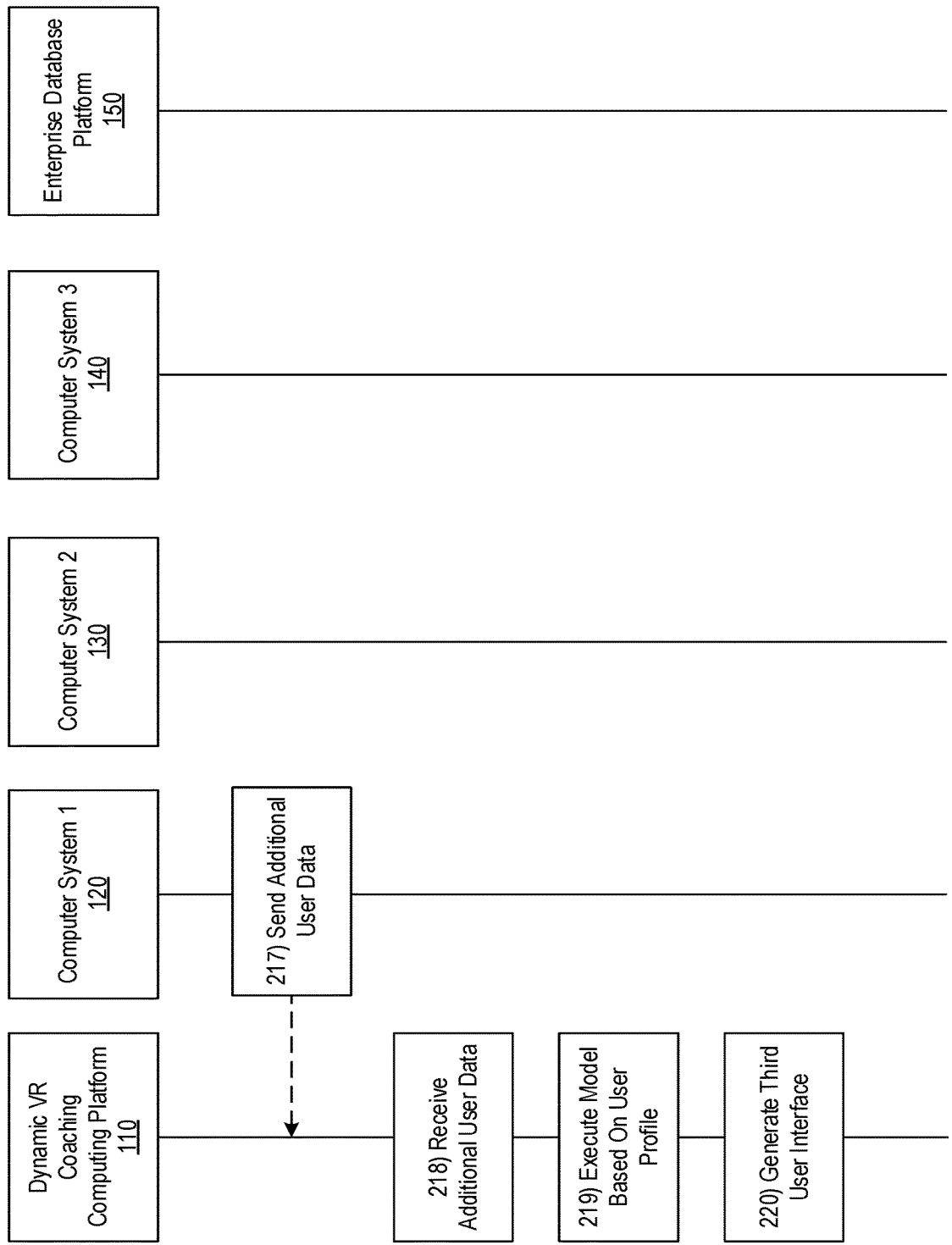

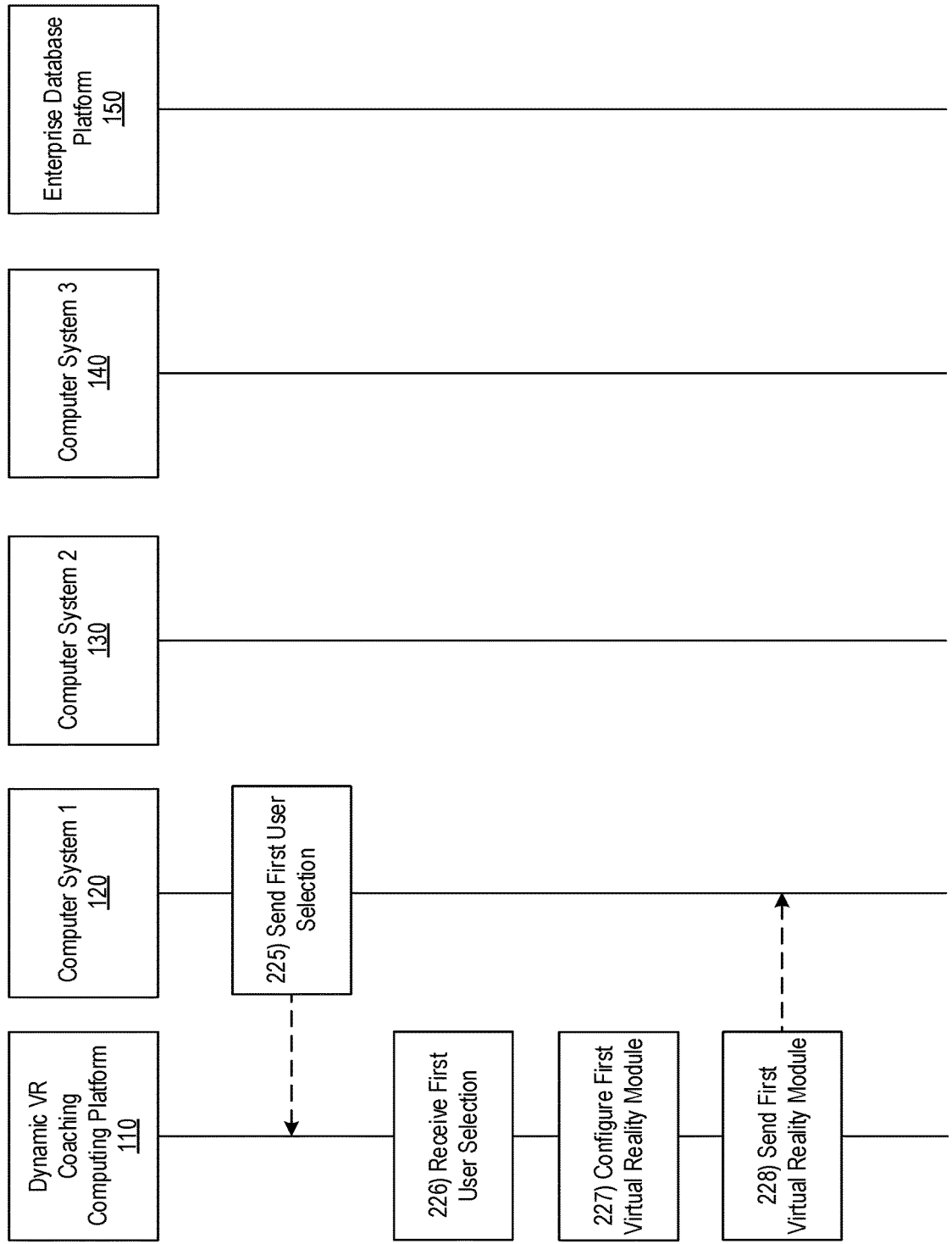

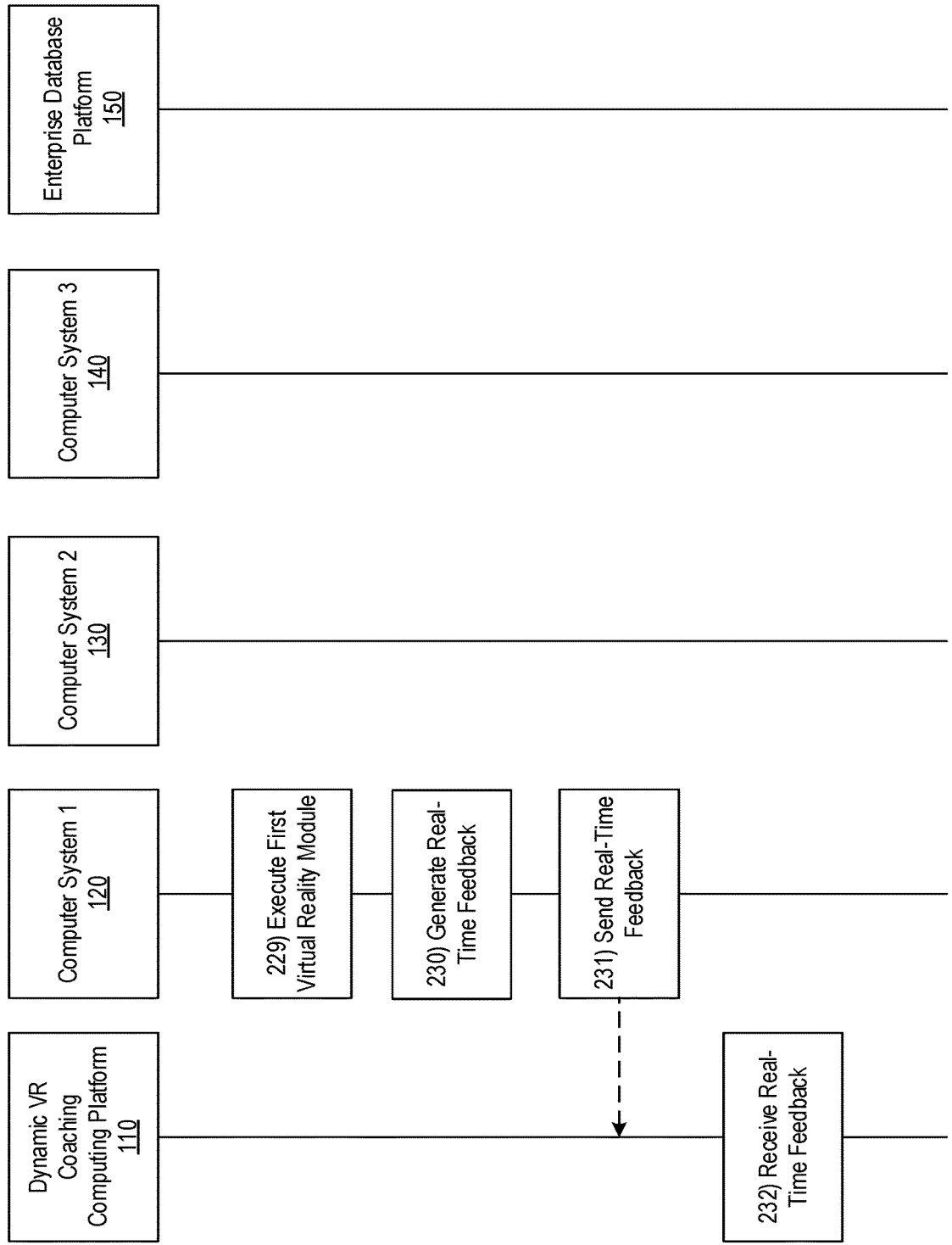

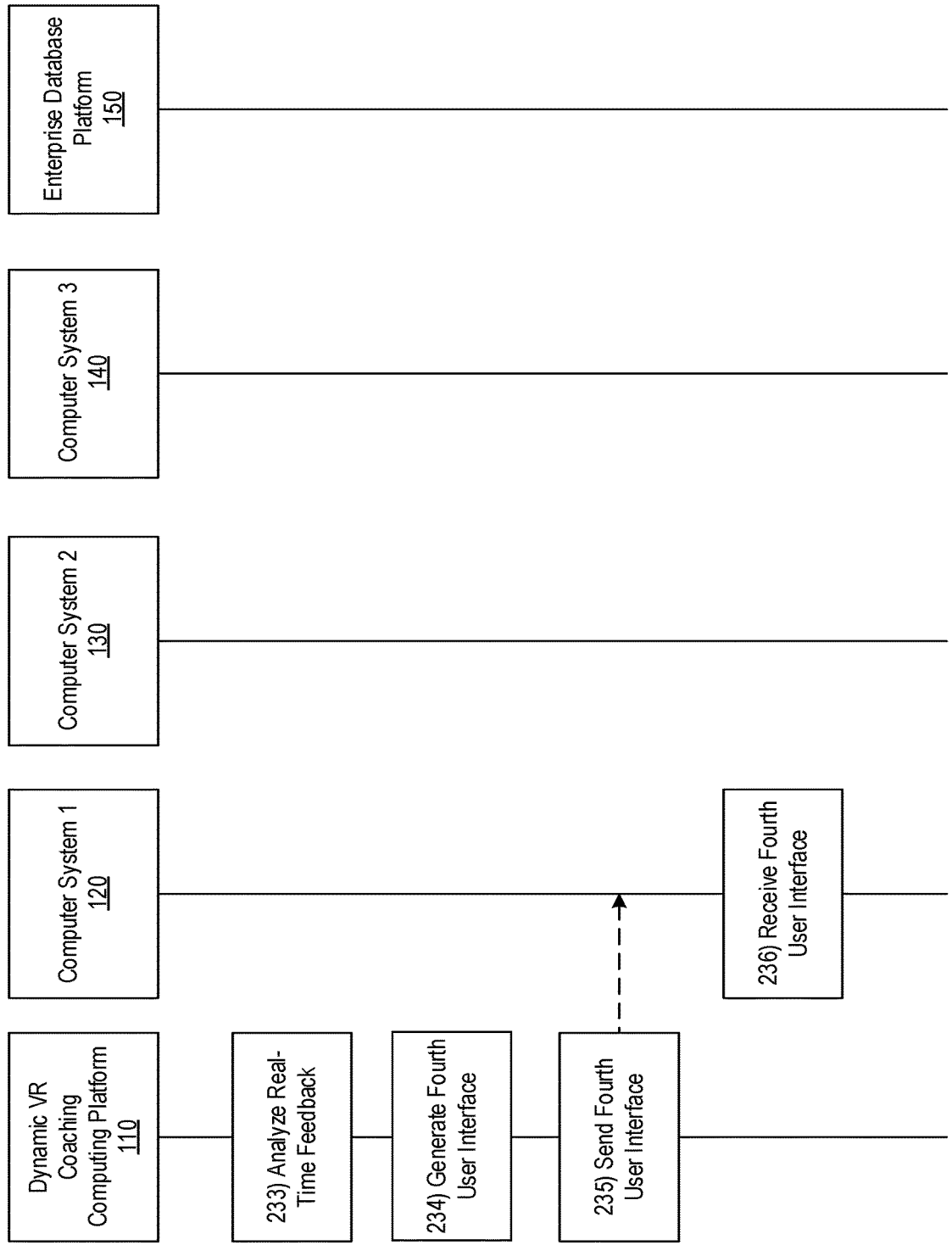

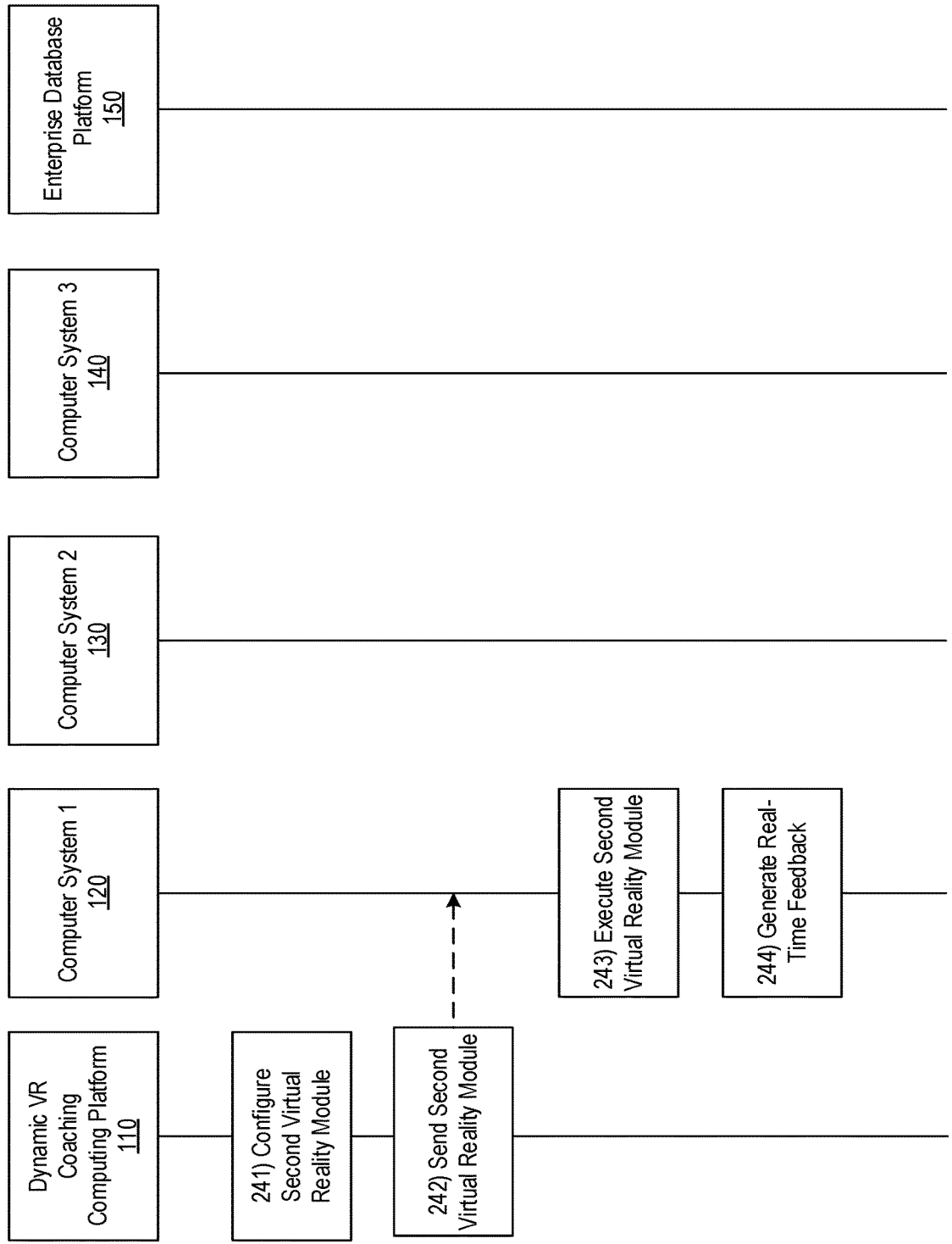

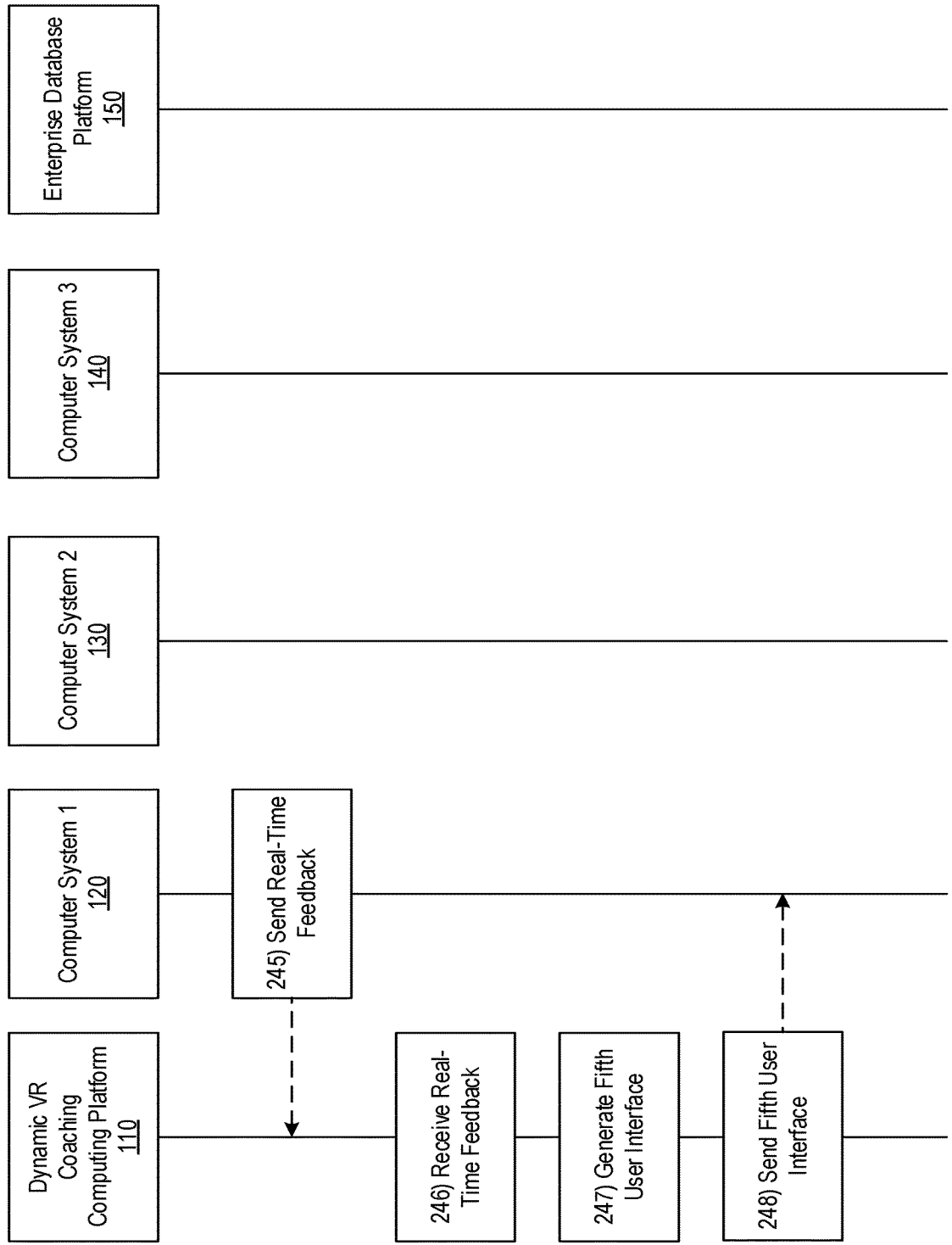

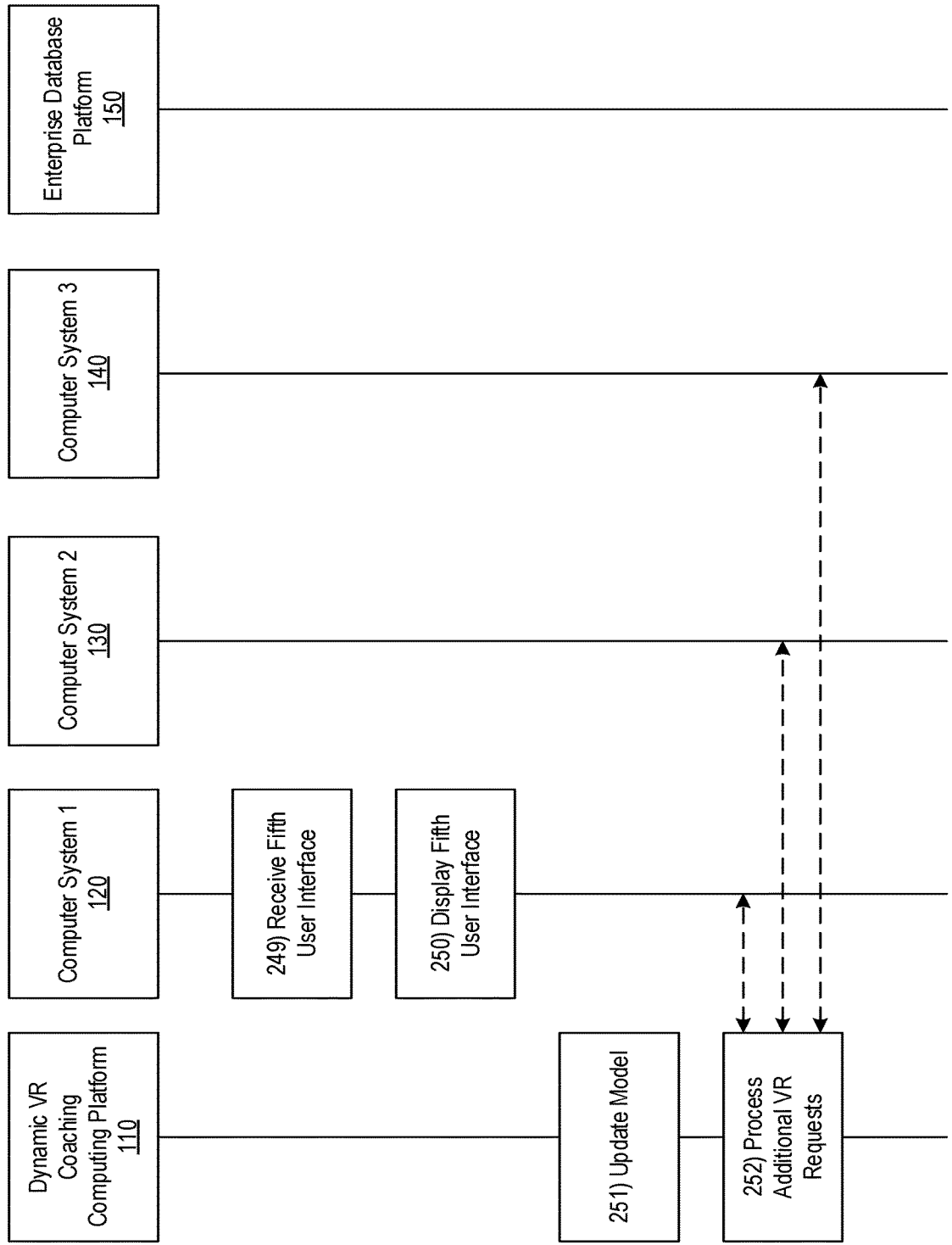

Virtual Reality Career Interface — 311

Please Enter Requested Data

- Data 1
- Data 2
- ⋮
- Data N

312

Please Rank the Following Careers

- Career 1
- Career 2
- ⋮
- Career N

Virtual Reality Career Interface

Select Virtual Reality Module:

Virtual Reality Module 1      Virtual Reality Module 2

Virtual Reality Module 3      Virtual Reality Module 4

Continue

320

Virtual Reality Career Interface

Results

Recommendation 1

Recommendation Data 1

Recommendation Data 2

Selectable Link To Additional Data

Recommendation 2

Recommendation Data 1

Recommendation Data 2

Selectable Link To Additional Data

DYNAMICALLY PROVIDING VIRTUAL REALITY (VR) COACHING USING REAL-TIME FEEDBACK LOOPS

BACKGROUND

Aspects of the disclosure relate to a dynamic virtual reality (VR) coaching computing platform. In particular, one or more aspects of the disclosure relate to configuring virtual reality modules based on user profiles and utilizing a real-time feedback loop to provide a user-tailored virtual reality coaching experience.

In some cases, enterprise organizations may maintain resource management systems that comprise hundreds or thousands of employees, careers, and job opportunities. It is difficult, if not impossible, for an individual to thoroughly explore each of these career/job opportunities on an opportunity-by-opportunity basis. Given the sheer number and complexity of the data sets that define these opportunities, it is difficult for current resource management systems to effectively process these data sets to provide tailored recommendations and/or VR experiences to users. Moreover, it is in the enterprise organization's best interest to assist individuals with navigating the many career/job opportunities offered by the enterprise organization to ensure that the enterprise organization hires the best candidates for those opportunities. To improve the user experience and to ensure that the enterprise organization finds the best individuals for its career/job opportunities, there is a need for a platform that provides dynamic VR coaching using real-time feedback loops.

SUMMARY

Aspects of the disclosure provide effective, efficient, scalable, and convenient technical solutions that address and overcome the technical problems associated with conventional resource management systems. In accordance with one or more embodiments of the disclosure, a computing platform comprising at least one processor, a communication interface, and memory storing computer-readable instructions may receive model training data from a plurality of computer systems. The computing platform may configure a model based on the model training data. The computing platform may generate a user profile for a user based on user data. The computing platform may configure a first virtual reality module based on the user profile and a first one or more user selections received from a first computer system. The computing platform may send the first virtual reality module to the first computer system, wherein sending the first virtual reality module to the first computer system causes the first computer system to execute the first virtual reality module. The computing platform may receive first real-time feedback associated with the first virtual reality module from the first computer system. The computing platform may generate, based on the first real-time feedback, a first user interface. The computing platform may send the first user interface to the first computer system, wherein sending the first user interface to the first computer system causes the first computer system to display the first user interface.

The computing platform may receive a second one or more user selections from the first computer system. The computing platform may configure a second virtual reality module based on the second one or more user selections and the user profile. The computing platform may send the second virtual reality module to the first computer system, wherein sending the second virtual reality module to the first computer system causes the first computer system to execute the second virtual reality module. The computing platform may receive second real-time feedback associated with the second virtual reality module from the first computer system. The computing platform may update the model based on the first real-time feedback and the second real-time feedback.

In one or more instances, the computing platform may receive the first one or more user selections from the first computer system in response to sending a second user interface to the first computer system, wherein sending the second user interface causes the first computer system to display the second user interface. In one or more instances, the first user interface may comprise a first plurality of VR modules. In one or more instances, the second user interface may comprise a second plurality of VR modules selected based on the first real-time feedback In one or more instances, the first real-time feedback may comprise a video recording of a user interacting with the first VR module. In one or more instances, the second real-time feedback may comprise an audio recording of a user interacting with the second VR module. In one or more instances, the user data may comprise an education level of a user.

The computing platform may generate a second user interface based on the first real-time feedback and the second real-time feedback. The computing platform may send the second user interface to the first computer system, wherein the sending the second user interface causes the first computer system to display the second user interface. In one or more instances, the second user interface may comprise a plurality of user recommendations. In one or more instances, the second user interface may further comprise a confidence score for each of the plurality of recommendations.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2M depict an illustrative event sequence for implementing a dynamic virtual reality coaching computing platform in accordance with one or more example embodiments;

FIGS. 3A-3D depict illustrative graphical user interfaces that implement a dynamic virtual reality coaching computing platform in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to a dynamic virtual reality (VR) coaching computing platform. To improve the efficiency of conventional employment searching systems, an enterprise may implement a dynamic VR coaching computing platform that utilizes real-time feedback loops to provide a user-tailored career coaching experience.

The dynamic VR coaching computing platform may be accessible by different individuals and may build a user profile for each of the users. The dynamic VR coaching computing platform may configure VR modules for users based on their user profiles. The dynamic VR coaching computing platform may deploy those VR modules to different computer systems associated with the users. The computer systems may execute those VR modules and provide real-time feedback to the dynamic VR coaching computing platform. The dynamic VR coaching computing platform may use the real-time feedback to configure and deploy additional VR modules for the users.

Figure 1A:
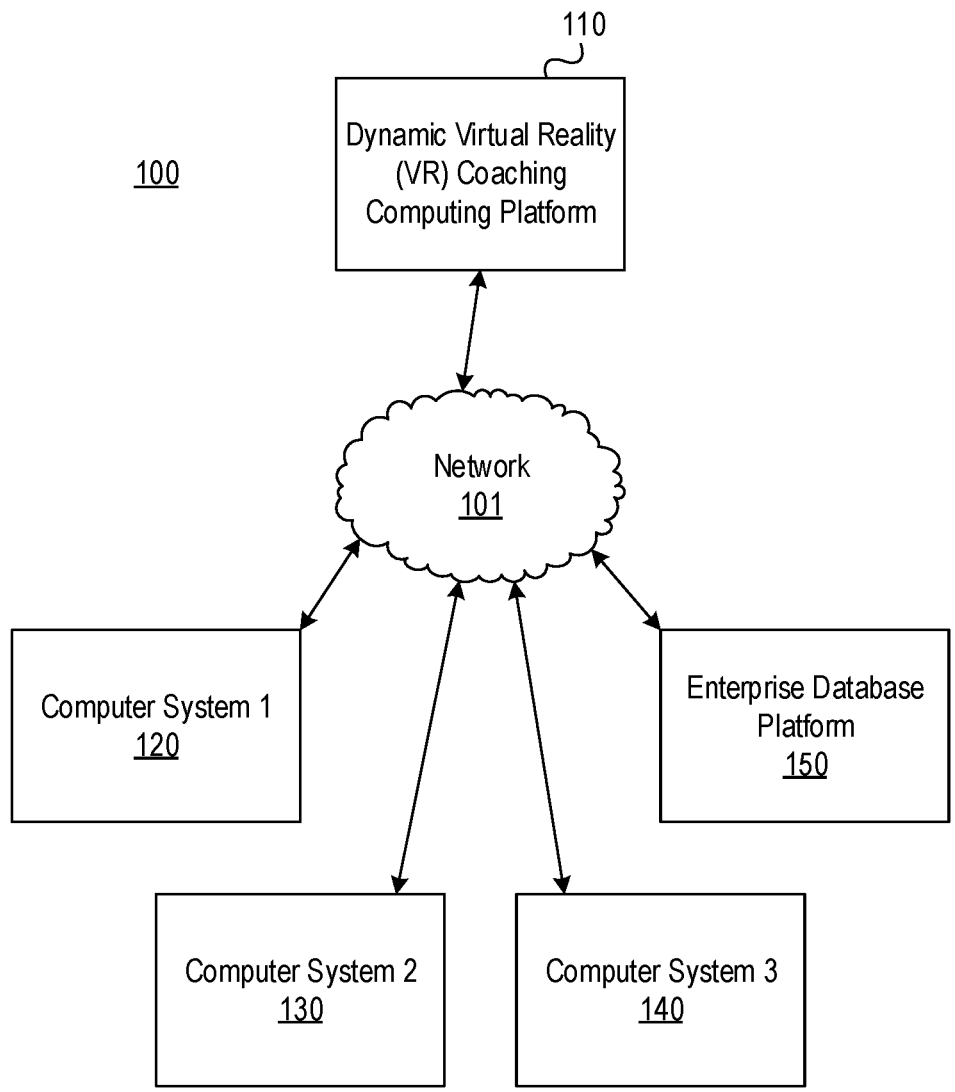
FIGS. 1A-1B depict an illustrative computing environment for implementing a dynamic virtual reality coaching computing platform in accordance with one or more example embodiments.
Figure 1B:
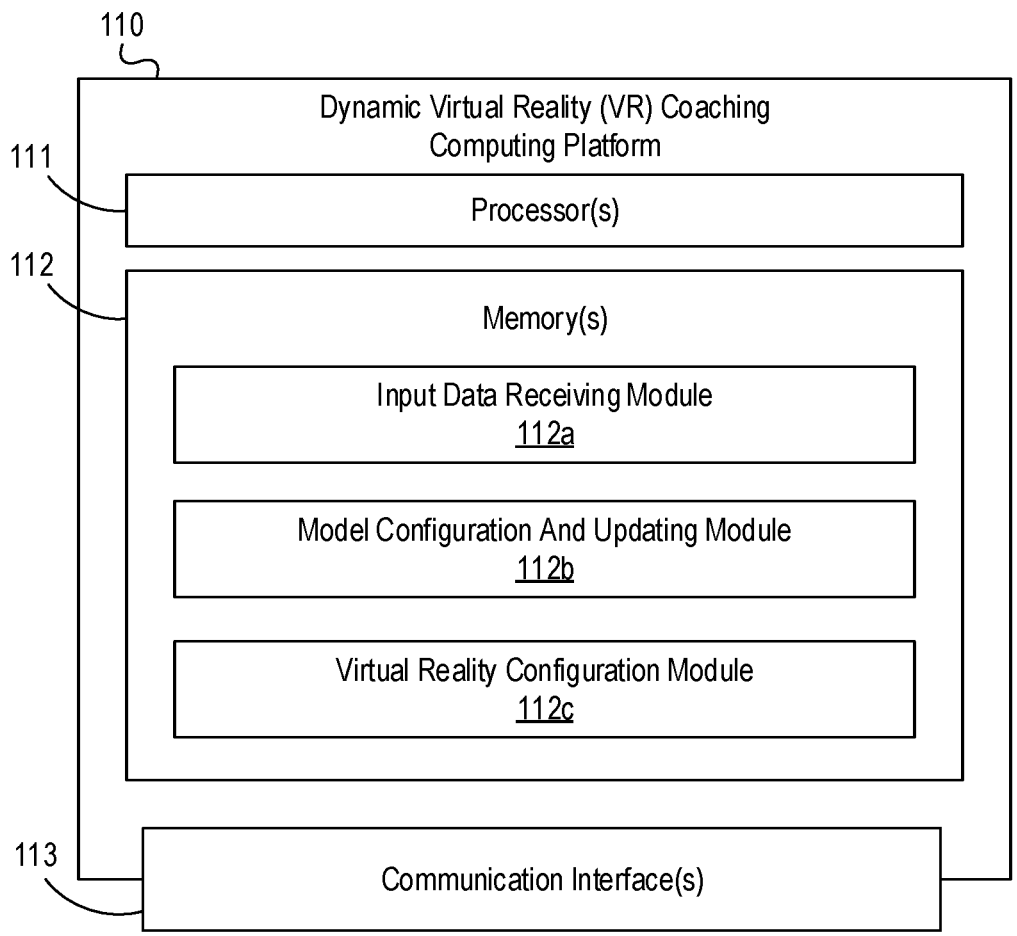

FIGS. 1A-1B depict an illustrative computing environment that implements a dynamic VR coaching computing platform in accordance with one or more example embodiments. Referring to FIG. 1A, computing environment 100 may include one or more computer systems. For example, computing environment 100 may include a dynamic VR coaching computing platform 110, a first computer system 120, a second computer system 130, and a third computer system 140.

As described further below, dynamic VR coaching computing platform 110 may be a computer system that includes one or more computing devices (e.g., servers, server blades, or the like) and/or other computer components (e.g., processors, memories, communication interfaces) that may be used to configure and deploy one or more VR modules. In some instances, dynamic VR coaching computing platform 110 may be controlled or otherwise maintained by an enterprise organization such as a financial institution.

Computer system 120 may be a computer system that includes one or more computing devices (e.g., servers, server blades, laptop computers, desktop computers, mobile devices, tablets, smartphones, credit card readers, or the like) and/or other computer components (e.g., processors, memories, communication interfaces) that may be used to perform enterprise operations and/or provide user functions (e.g., user-oriented career coaching functions). In one or more instances, computer system 120 may be configured to communicate with dynamic VR coaching computing platform 110 for model configuration/training, user profile configuration, VR module configuration, VR module execution, and/or feedback communication. Computer system 130 and computer system 140 may be computing systems similar to computer system 120.

Enterprise database platform 150 may comprise one or more servers or computer systems that store one or more databases. The data stored in the databases of enterprise database platform 150 may include any of the records stored in computer system 120, computer system 130, computer system 140, as well as any additional data of the enterprise. The databases stored on enterprise database platform 150 may be accessed by and/or modified by any of dynamic VR coaching computing platform 110, computer system 120, computer system 130, and computer system 140.

Computing environment 100 also may include one or more networks, which may interconnect dynamic VR coaching computing platform 110, computer system 120, computer system 130, computer system 140, and enterprise database platform 150. For example, computing environment 100 may include a network 101 (which may interconnect, e.g., dynamic VR coaching computing platform 110, computer system 120, computer system 130, computer system 140, and enterprise database platform 150).

In one or more arrangements, dynamic VR coaching computing platform 110, computer system 120, computer system 130, computer system 140, and enterprise database platform 150 may be any type of computing device capable of sending and/or receiving requests and processing the requests accordingly. For example, dynamic VR coaching computing platform 110, computer system 120, computer system 130, computer system 140, enterprise database platform 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of dynamic VR coaching computing platform 110, computer system 120, computer system 130, computer system 140, and enterprise database platform 150, may, in some instances, be special-purpose computing devices configured to perform specific functions.

Referring to FIG. 1B, dynamic VR coaching computing platform 110 may include one or more processors 111, memory 112, and communication interface 113. A data bus may interconnect processor 111, memory 112, and communication interface 113. Communication interface 113 may be a network interface configured to support communication between dynamic VR coaching computing platform 110 and one or more networks (e.g., network 101, or the like). Memory 112 may include one or more program modules having instructions that when executed by processor 111 cause dynamic VR coaching computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of dynamic VR coaching computing platform 110 and/or by different computing devices that may form and/or otherwise make up dynamic VR coaching computing platform 110. For example, memory 112 may have, host, store, and/or include input data receiving module 112a, model configuration and updating module 112b, and virtual reality configuration module 112c.

Input data receiving module 112a may have instructions that direct and/or cause dynamic VR coaching computing platform 110 to receive input data from any of the computing systems shown in FIG. 1A (i.e., computer system 120, computer system 130, computer system 140, and enterprise database platform 150). Model configuration and updating module 112b may have instructions that direct and/or cause dynamic VR coaching computing platform 110 to configure and update a VR coaching model. Virtual reality configuration module 112c may have instructions that direct and/or cause dynamic VR coaching computing platform 110 to configure one or more VR modules for deployment by dynamic VR coaching computing platform 110.

Figure 2A:
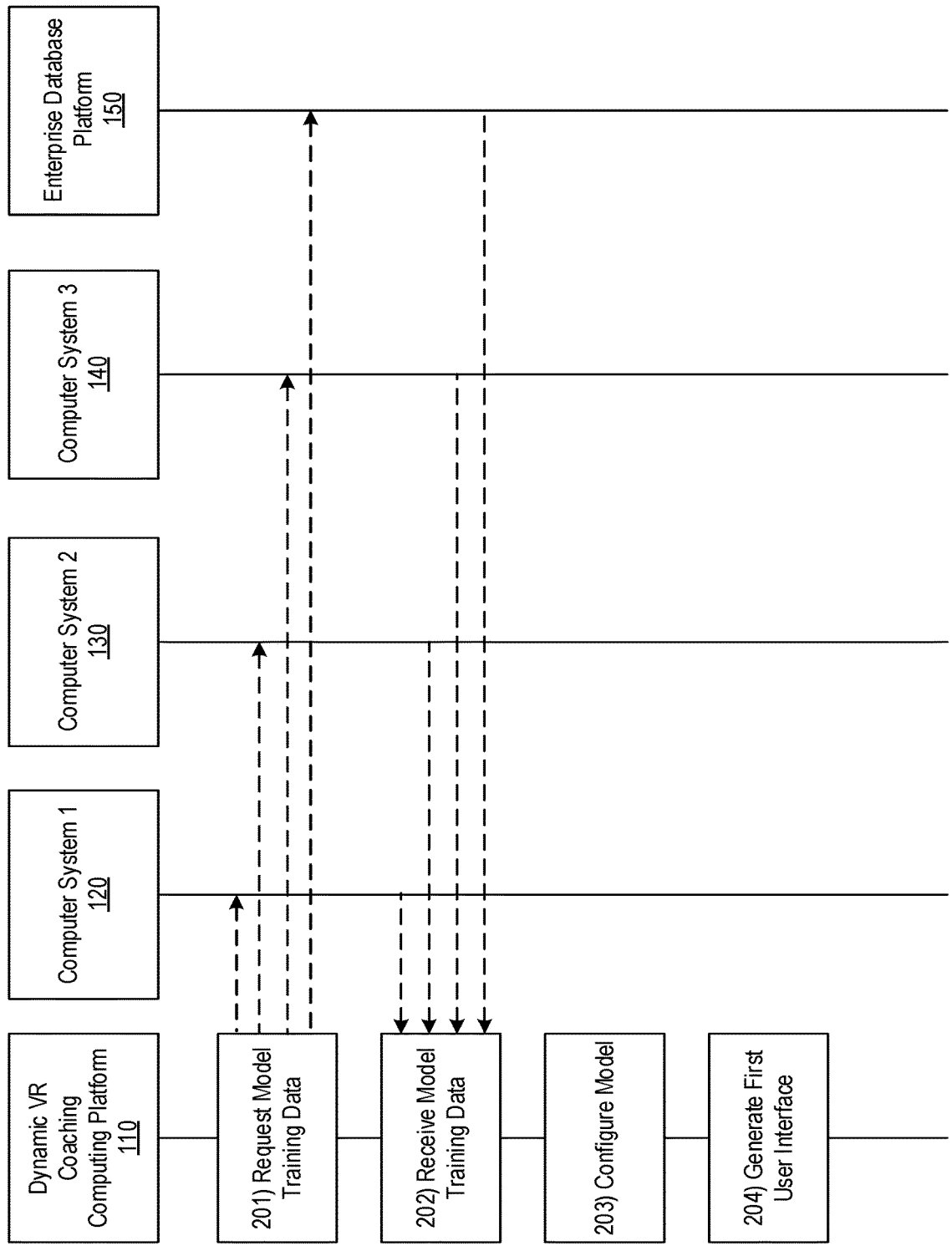

FIGS. 2A-2M depict an illustrative event sequence for implementing a dynamic VR coaching computing platform 110 in accordance with one or more example embodiments. Referring to FIG. 2A, at step 201, dynamic VR coaching computing platform 110 may request model training data for a VR coaching model from one or more of computer system 120, computer system 130, computer system 140, and/or enterprise data platform 150. The dynamic VR coaching computing platform 110 may request the model training data for the VR coaching model from one or more of computer system 120, computer system 130, computer system 140, and/or enterprise data platform 150 in order to configure and train the VR coaching model.

Once the VR coaching model has been configured and trained, dynamic VR coaching computing platform 110 may input one or more user-based parameters into the VR coaching model. In response, the dynamic VR coaching computing platform 110 may receive, from the VR coaching model, one or more outputs related to the user, such as job recommendations for the user, career recommendations for the user, VR modules for the user, training modules for the user, and the like. In another example, once the VR coaching model has been configured and trained, dynamic VR coaching computing platform 110 may input one or more opportunity-based parameters into the VR coaching model. In response, the dynamic VR coaching computing platform 110 may receive, from the VR coaching model, one or more outputs related to the opportunity, such as potential candidates for the opportunity.

In order to configure and train the VR coaching model, dynamic VR coaching computing platform 110 may request and receive user data, career data, job data, enterprise data, industry data, and/or the like from computer system 120, computer system 130, computer system 140, and/or enterprise database platform 150. The requested data may include job descriptions for positions both internal to the enterprise and external to the enterprise. The positions may be vacant positions, currently filled positions, and/or potential future positions. The requested data may include trend data for vacant positions, currently filled positions, and/or potential future positions. These positions may be internal to the enterprise and/or external to the enterprise.

The requested data may also be individual user data. For example, dynamic VR coaching computing platform 110 may request performance data for current and former employees of the enterprise organization. In another example, dynamic VR coaching computing platform 110 may request, from one or more individuals and for one or more positions, data indicating desirable traits, qualities, educational requirements, and skills for candidates interested in those positions. In yet another example, dynamic VR coaching computing platform 110 may request written records of any interviews conducted by individuals at the enterprise organizations, along with written documents associated with those interviews, such as transcripts, records, notes, feedback, and the like. Dynamic VR coaching computing platform 110 may additionally or alternatively request resume data from computer system 120, computer system 130, computer system 140, and/or enterprise database platform 150. The resume data may be resumes that were collected during the hiring process, including resumes for individuals that were interviewed and hired, and individuals that were not interviewed and/or hired. Dynamic VR coaching computing platform 110 may request employment data for both current and past employees of the enterprise organization. The employment data may include education of the employees, the skills/qualifications of the employees, and the like.

At step 202, dynamic VR coaching computing platform 110 may receive the requested data from computer system 120, computer system 130, computer system 140, and/or enterprise database platform 150. The requested data may be stored in internal memory of dynamic VR coaching platform 110, and/or external memory. At step 203, dynamic VR coaching computing platform 110 may configure and train the VR coaching model based on the data received at step 202. To configure and train the VR coaching model, dynamic VR coaching computing platform 110 may process all (or a subset) of the data received at step 202 by applying natural language processing and/or other processing to the data received at step 202 to generate and store one or more classification models.

For example, in configuring and training the VR coaching model, dynamic VR coaching computing platform 110 may apply natural language processing to the job descriptions to identify different keywords in the job descriptions and to group the job descriptions based on those identified keywords. For example, dynamic VR coaching computing platform 110 may identify and group the job descriptions based on the types of jobs indicated by the identified keywords. In another example, dynamic VR coaching computing platform 110 may mine the interview data, the resume data, the performance data, and the employment data to determine which skills, qualities, qualifications, and education levels are desirable for particular positions. For instance, based on mining the interview data, the resume data, the performance data, and the employment data received by dynamic VR coaching computing platform 110 at step 202, dynamic VR coaching computing platform 110 may determine that for a first position, desirable candidates will have both an undergraduate degree and a masters degree, while for a second position, desirable candidates will have only an undergraduate degree.

Additionally or alternatively, in configuring and training the VR coaching model, dynamic VR coaching computing platform 110 may also perform gap analysis to identify desirable skills, qualities, qualifications, and education levels for particular positions. For example, for a previously vacant position, dynamic VR coaching computing platform 110 may receive, at step 202, all of the resumes of candidates who applied for the position. Dynamic VR coaching computing platform 110 may then process the resumes to compare the skills, qualities, qualifications, and education levels of candidates that were interviewed and/or hired to the skills, qualities, qualifications, and education levels of candidates that were not interviewed and/or hired. This processing may result in a list of desirable skills, qualities, qualifications, and education levels for that position. Dynamic VR coaching platform 110 may then extrapolate that list to identify desirable skills, qualities, qualifications, and education levels for similar positions.

In addition to processing the data received at step 202 for objectively quantifiable skills, qualities, qualifications, and education levels, dynamic VR coaching computing platform 110 may process the data received at step 202 to identify soft skills that are desirable for particular positions. The soft skills may include, but are not limited to, leadership skills, teamwork skills, communication skills, problem-solving skills, interpersonal skills, and the like. For example, dynamic VR coaching computing platform 110 may determine, based on the processing of employment data, performance data, resume data, and/or interview transcript data, that desirable candidates for a particular position would have at least three years of experience leading a team of at least five individuals, while a desirable candidate for a different position does not need to have any leadership skills.

Figure 3A:
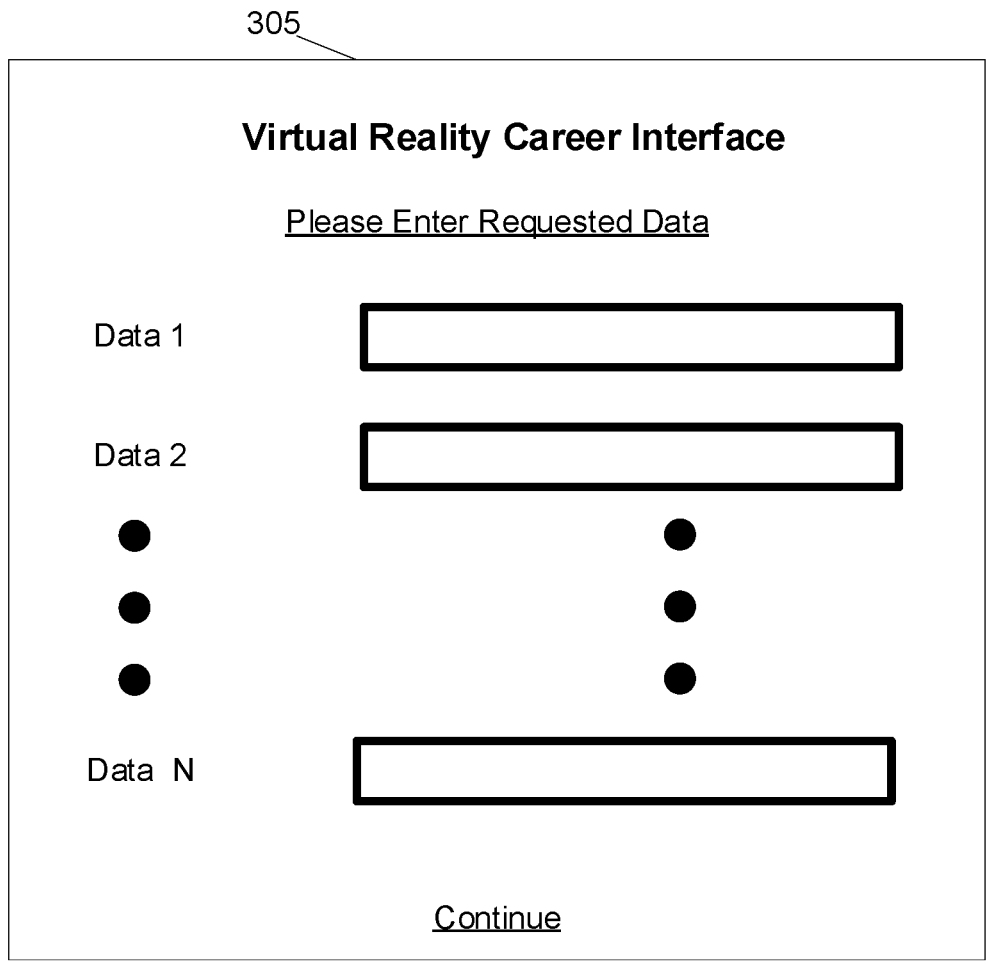

At step 204, dynamic VR coaching computing platform 110 may generate a first user interface, illustrated in FIG. 3A. Referring to FIG. 3A, first user interface 305 may be directed to requesting, from a user, data that can be input by the dynamic VR coaching computing platform 110 into the VR coaching model. Though three data fields are illustrated in first user interface 305, a greater number of data fields or a fewer number of data fields may be included in the first user interface 305 by dynamic VR coaching computing platform 110. The data fields may be related to any of the skills, qualities, qualifications, and education levels identified by dynamic VR coaching computing platform 110 during the processing discussed above with reference to step 203. For example, first user interface 305 may request that the user enter data related to their education, past work experience, and the like. Additionally, or alternatively, the requested data may be related to user preferences (i.e., specific positions that the user is interested in).

Figure 2B:
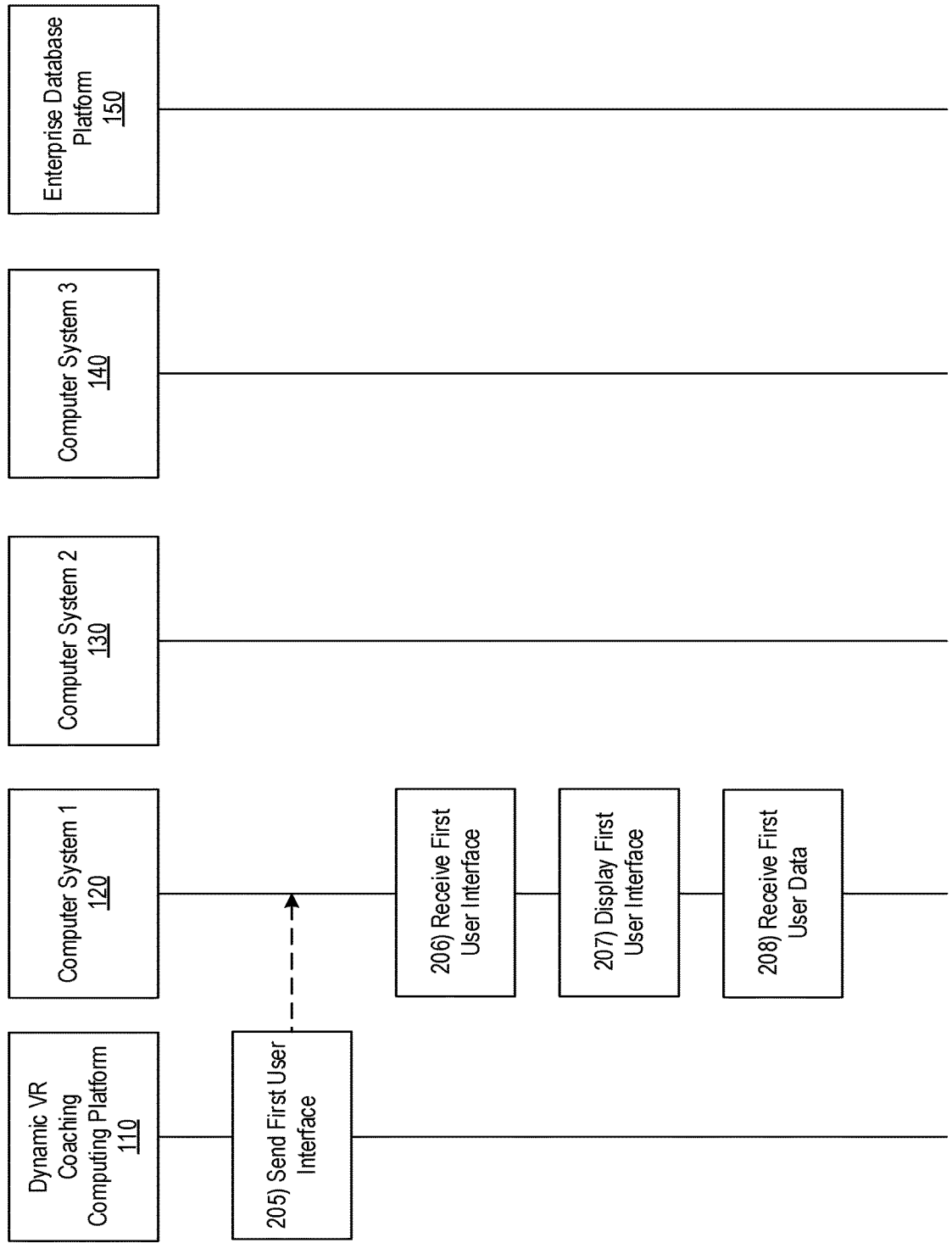

Referring to FIG. 2B, at step 205, dynamic VR coaching computing platform 110 may send the first user interface to computer system 120. Dynamic VR coaching computing platform 110 may send the first user interface to computer system 120 at step 205 in response to receiving a request from computer system 120 for the first user interface. The sending of the first user interface from dynamic VR coaching computing platform 110 to computer system 120 may cause computer system 120 to display the first user interface. Specifically, at step 206, computer system 120 may receive the first user interface sent by dynamic VR coaching computing platform 110. At step 207, computer system 120 may display the first user interface received at step 206 on a display device of computer system 120. At step 208, and in response to outputting the first user interface to the display device for display, computer system 120 may receive first user data via the first user interface. The first user data may be all of the data requested in the first user interface, or a subset of the requested data.

Figure 2C:
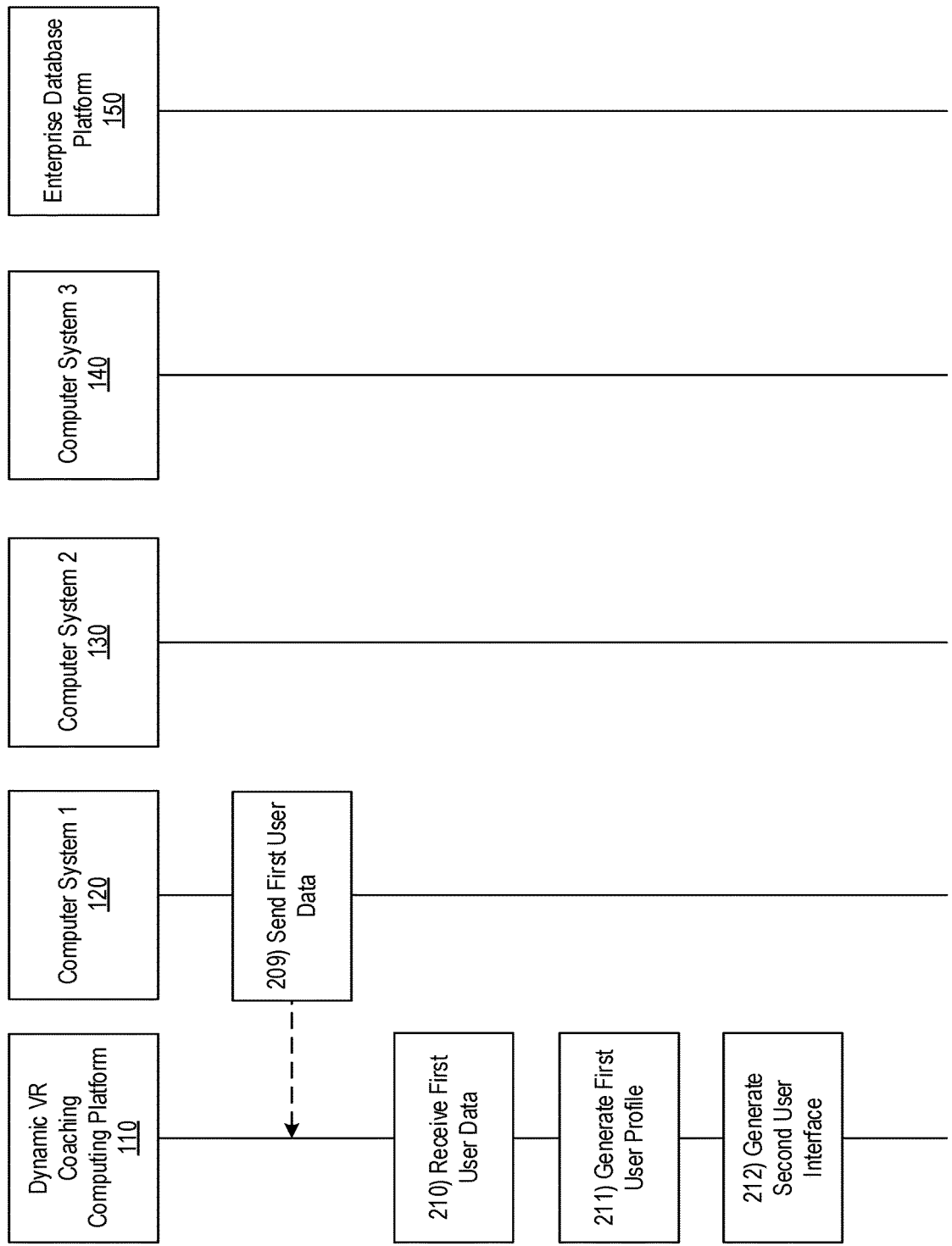

Referring to FIG. 2C, at step 209, computer system 120 may send the first user data received at step 208 to dynamic VR coaching computing platform 110. At step 210, dynamic VR coaching computing platform 110 may receive the first user data from computer system 120. In response to receiving the first user data from computer system 120, dynamic VR coaching computing platform 110 may generate, at step 211, a user profile for the user. The user profile may be an internal software module maintained by the dynamic VR coaching computing platform 110. The user profiles may be stored in internal memory of dynamic VR coaching platform 110, external memory, and/or the VR coaching model. The user profiles may store data such as skills, qualities, qualifications, education levels, and preferences for the user. This data may be retrieved from the first user data received in step 210. Dynamic VR coaching computing platform 110 may supplement this data with any of the data received at step 202. For example, if a resume of the user, employment history of the user, performance reviews for the user, or the like was received by dynamic VR coaching computing platform 110 in step 202, dynamic VR coaching computing platform 110 may store that data within the user profile for the user.

At step 212, dynamic VR coaching computing platform 110 may generate a second user interface. The second user interface may be based on an analysis of the first user data received at step 210 and, if applicable, data for the user received at step 202. For example, dynamic VR coaching computing platform 110 may determine whether any necessary data for the user is missing from the first user data received at step 210. Additionally, or alternatively, dynamic VR coaching computing platform 110 may determine if there is a need to request updated data from the user based on data received for the user at step 202. For example, if employment history for the user was received at step 202, dynamic VR coaching computing platform 110 may process that employment history to determine if there is any gap in the data—if so, dynamic VR coaching computing platform 110 may determine that the missing data should be requested from the user. In another example, dynamic VR coaching computing platform 110 may analyze the user preferences received at step 210 and request additional data based on those user preferences.

The second user interface is illustrated in FIG. 3B. Referring to FIG. 3B, the second user interface 310 may include a first one or more data fields 311 requesting updated/missing data from the user, such as updated employment data. The second user interface 310 may include second one or more data fields 312 generated based on the analysis performed by dynamic VR coaching computing platform 110. For example, if the first user data received by dynamic VR coaching computing platform 110 at step 210 indicated that the user had not narrowed down their search to a particular career, the second one or more data fields 312 may include a listing of different careers and may request that the user rank the listed careers.

Figure 2D:
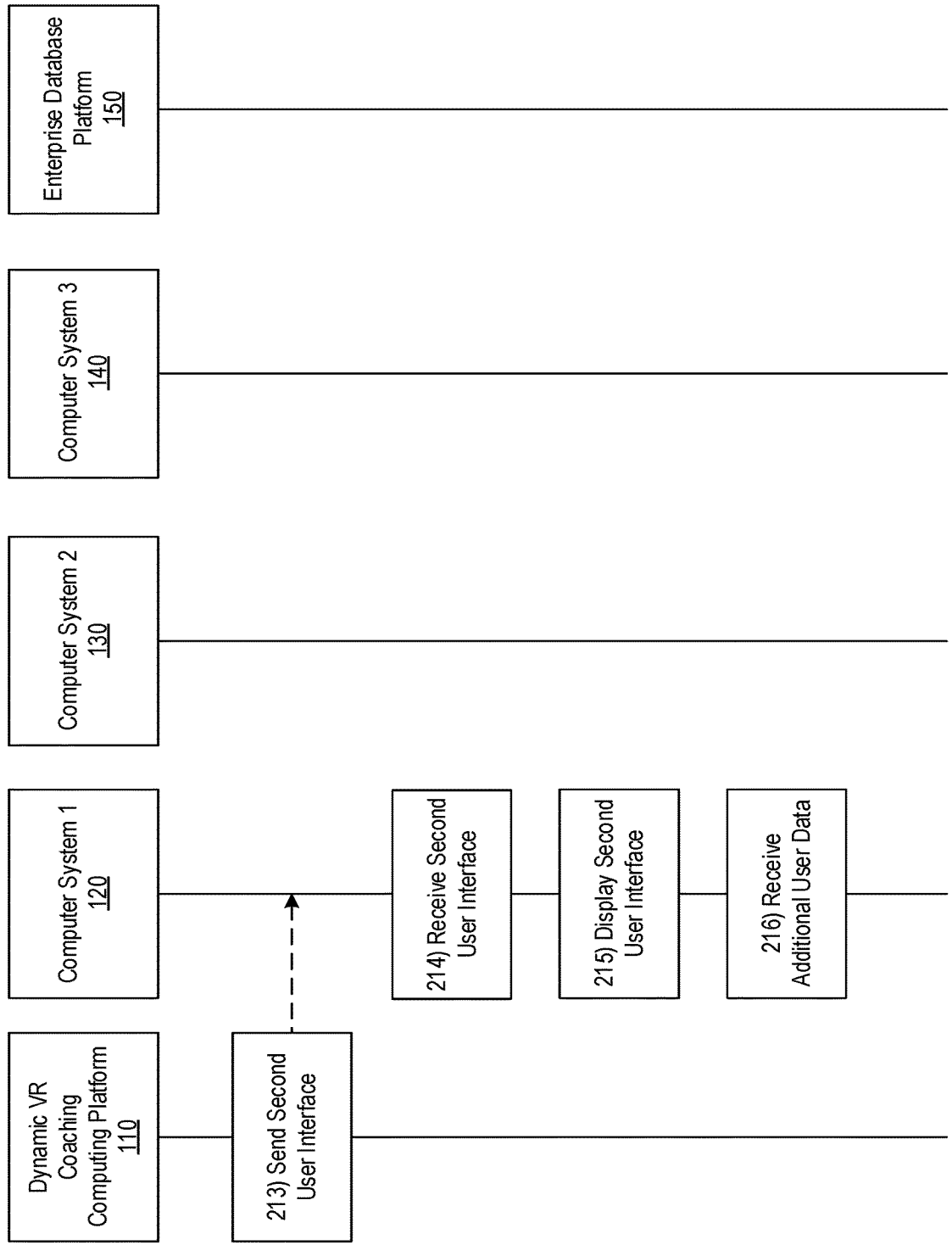

Referring to FIG. 2D, at step 213, dynamic VR coaching computing platform 110 may send the second user interface to computer system 120, wherein the sending the second user interface to computer system 120 may cause computer system 120 to output the second user interface for display. Specifically, at step 214, computer system 120 may receive the second user interface sent by dynamic VR coaching computing platform 110. In response, computer system 120 may, at step 215, output the second user interface for display on the display device of computer system 120. At step 216, computer system 120 may receive, via the second user interface, additional user data. The additional user data may include the requested data in the first one or more data fields 311 and/or second one or more data fields 311 of second user interface 310.

Referring to FIG. 2E, at step 217, computer system 120 may send the additional user data to dynamic VR coaching computing platform 110. At step 218, dynamic VR coaching computing platform 110 may receive the additional user data sent by computer system 120. In response to receiving the additional user data, dynamic VR coaching computing platform 110 may update the user profile to include the additional user data received at step 218. At step 219, dynamic VR coaching computing platform 110 may execute the VR coaching model using data from the user profile. Specifically, dynamic VR coaching computing platform 110 may input one or more user-based parameters into the VR coaching model. These user-based parameters may include any of the skills, qualities, qualifications, education levels, and preferences stored for the user in the user profile. In response to dynamic VR coaching computing platform 110 inputting the user parameters and running the model, the model may generate one or more outputs related to the user, such as job recommendations for the user, career recommendations for the user, VR modules for the user, training modules for the user, and the like. Dynamic VR coaching computing platform 110 may receive these outputs from the VR coaching model.

Figure 3C:
Figure 3C:
Figure 3C:
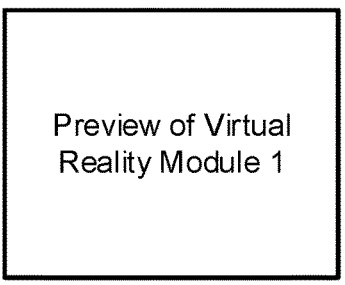
Figure 3C:
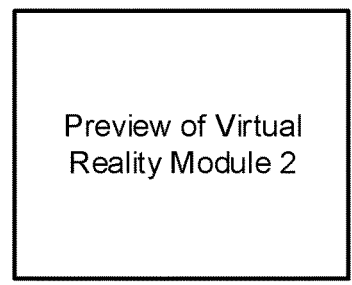
Figure 3C:
Figure 3C:
Figure 3C:
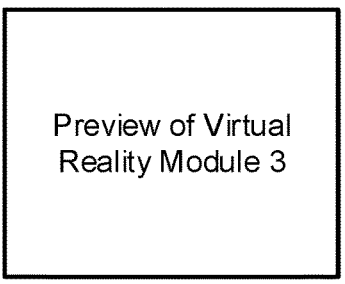
Figure 3C:
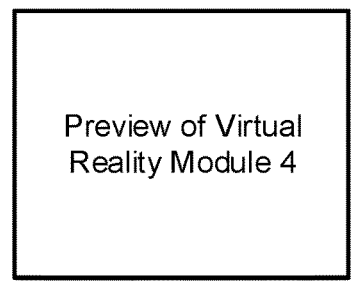

At step 220, dynamic VR coaching computing platform 110 may generate a third user interface. Dynamic VR coaching computing platform 110 may generate the third user interface based on the outputs received from the execution of the VR coaching model. In one example, the VR coaching model may generate outputs identifying a plurality of VR modules that may be of interest to the user. The VR coaching model may have selected these particular VR modules based on the inputted model parameters identifying skills, qualities, qualifications, education levels, and preferences for the user. Thus, at step 220, dynamic VR coaching computing platform 110 may generate a third user interface based on the VR modules recommended by the VR coaching model. The third user interface is illustrated in FIG. 3C. Referring to FIG. 3C, the third user interface 315 may include a listing of the virtual reality modules identified by the VR coaching model as being of potential interest to the user. In one example, dynamic VR coaching computing platform 110 may include all of the VR modules identified by the VR coaching model in the third user interface 315. In another example, dynamic VR coaching computing platform 110 may include only a subset of the VR modules identified by the VR coaching model in the third user interface 315. In addition to listing the titles of the VR modules, the third user interface 315 may also include a preview of each of the listed VR modules. The previews may be a textual description of the VR module, an image of the VR module, or a short video excerpt of the VR module.

Figure 2F:
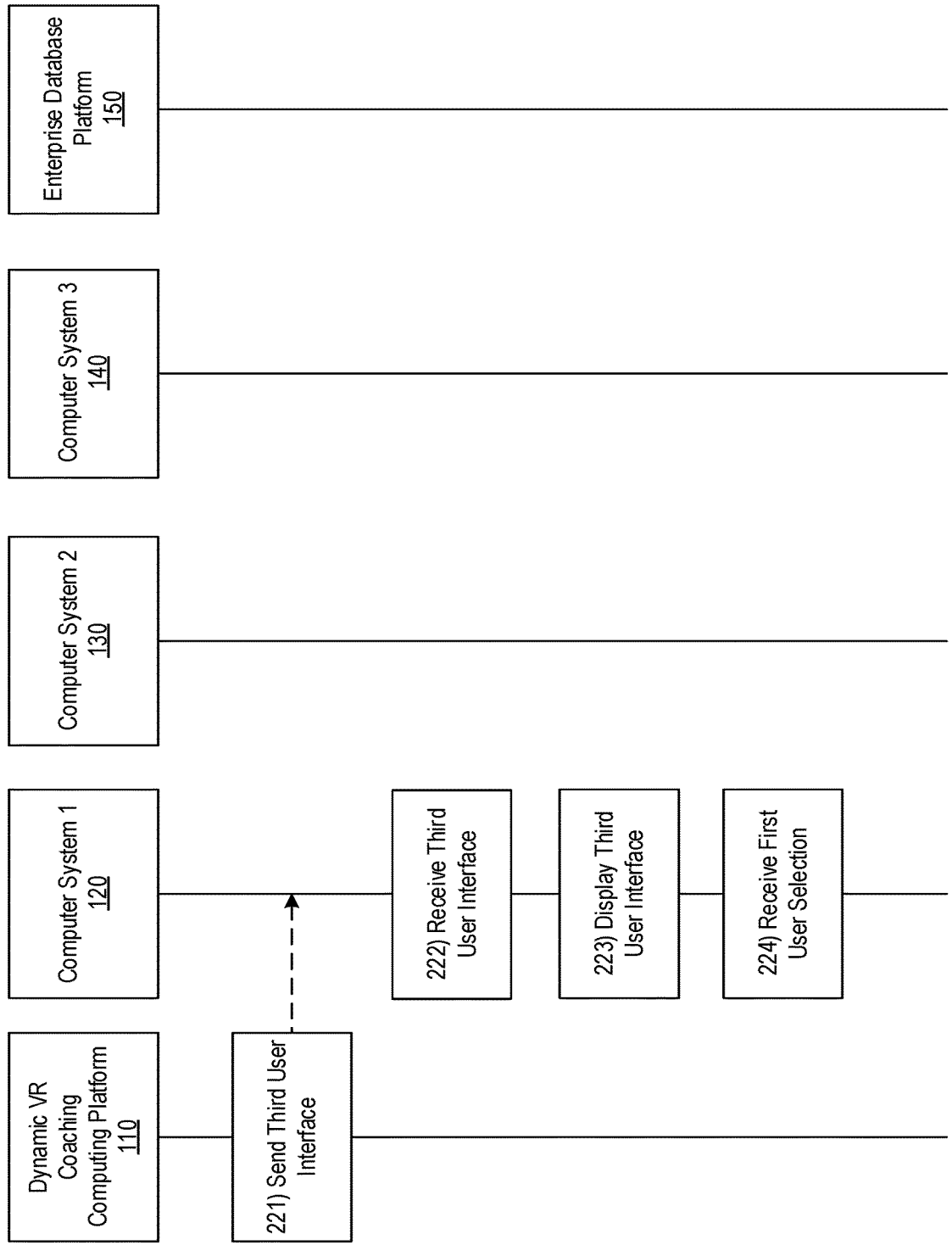

Referring to FIG. 2F, at step 221, dynamic VR coaching computing platform 110 may send the third user interface to computer system 120, wherein the sending the third user interface to computer system 120 may cause computer system 120 to display the third user interface. Specifically, at step 222, computer system 120 may receive the third user interface sent by dynamic VR coaching computing platform 110 at step 221. In response, computer system 120 may output the third user interface for display on the display device of computer system 120. At step 225, computer system 120 may receive, via the third user interface, one or more user selections. The user selections may identify particular VR modules, of those listed on the third user interface, that the user has selected to initiate.

Referring to FIG. 2G, at step 225, computer system 120 may send the one or more user selections to dynamic VR coaching computing platform 110. At step 226, dynamic VR coaching computing platform 110 may receive the one or more user selections identifying the selected VR modules from computer system 120. In response, dynamic VR coaching computing platform 110 may, at step 227, configure the first VR module. If the user selections received at step 226 only identified a single VR module, dynamic VR coaching computing platform 110 may configure the single-identified VR module. If multiple VR modules were identified by the user selections received by dynamic VR coaching computing platform 110 at step 226, dynamic VR coaching computing platform 110 may select one of the multiple VR modules for configuration. For example, the user selections received by dynamic VR coaching computing platform 110 may include a ranking for each selected VR module. Dynamic VR coaching computing platform 110 may use these rankings to identify the highest-ranked VR module for configuration. If no ranking is provided in the user selections received by dynamic VR coaching computing platform 110, dynamic VR coaching computing platform 110 may select a VR module by determining, based on the user profile, which of the multiple VR modules is most relevant to the user.

Configuring the VR module may include selecting among multiple options available for the selected VR module. For example, dynamic VR coaching computing platform 110 may customize, based on user selections and/or the user profile, the specific scenarios to be presented in the VR module, the role of the user within the VR module, the responsibilities of the user within the VR module, the physical environment to be used within the VR module, the characteristics of the actors within the VR module (such as gender, appearance), the simulations to be included in the VR module, and the like. At step 228, once the first VR module has been configured, dynamic VR coaching computing platform 110 may send the first VR module to computer system 120. The sending of the first VR module from dynamic VR coaching computing platform 110 to computer system 120 may cause computer system 120 to execute the first VR module.

Specifically, referring to FIG. 2H, at step 229, computer system 120 may execute the first VR module in response to receiving the first VR module from dynamic VR coaching computing platform 110. Execution of the first VR module by computer system 120 may result in the video display of the first VR module on the display device of computer system 120, accompanied by the outputting of the corresponding audio.

During execution of the first VR module by computer system 120, computer system 120 may generate real-time feedback. The real-time feedback may be generated based on one or more user inputs at computer system 120. For example, as part of the first VR module, the user may be requested to enter data into computer system 120. The data entered by the user (or, the failure of the user to enter any data) may be real-time feedback generated by computer system 120. In another example, computer system 120 may track the reaction of the user using one or more tracking devices, such as a camera, microphone, and/or sensors placed on the user or within close proximity to the user. Using these tracking devices, computer system 120 may record any words spoken by the user during execution of the first VR module, the physical movements of the user during execution of the first VR module, the facial expressions of the user during execution of the first VR module, or the like. At step 231, computer system 120 may send this feedback to dynamic VR coaching computing platform 110 via a feedback loop. Computer system 120 may send the feedback to dynamic VR coaching computing platform 110 in real-time (i.e., as it is received by computer system 120) or at predetermined time intervals. Computer system 120 may continue generating the real-time feedback and sending the real-time feedback to dynamic VR coaching computing platform 110 via the feedback loop throughout the execution of the first VR module. At step 232, dynamic VR coaching computing platform 110 may receive the real-time feedback generated and sent by computer system 120.

Referring to FIG. 2I, at step 233, dynamic VR coaching computing platform 110 may analyze the real-time feedback received at step 232 from computer system 120. Dynamic VR coaching computing platform 110 may analyze the real-time feedback to determine whether the user is actively engaging with the first VR module, or whether the user appears to have lost interest in the first VR module. For example, dynamic VR coaching computing platform 110 may determine, based on the real-time feedback, that the user is actively engaged with the first VR module because the user is timely entering the data requested during the first VR module and the user is smiling while participating in the first VR module. In other example, dynamic VR coaching computing platform 110 may determine that the user has lost interest in the first VR module based on the user's facial expressions, based on user speaking negatively about the first VR module, or based on a lack of user inputs during execution of the first VR module. Based on its analysis of the real-time feedback, dynamic VR coaching computing platform 110 may update the user profile to include data indicating the user's engagement with the first VR module.

Based on its analysis of the real-time feedback received from computer system 120, dynamic VR coaching computing platform 110 may generate a fourth user interface. The fourth user interface may be similar to that shown in FIG. 3C. Specifically, the fourth user interface may include one or more selectable VR modules. The fourth user interface may include the titles of the selected VR modules, as well as textual, audio, and/or video previews of the VR modules. If the analysis of the real-time feedback indicated that the user was not actively engaging with the first VR module, dynamic VR coaching computing platform 110 may generate (and send) the fourth user interface without waiting for the first VR module to finish. The fourth user interface may provide the user with the option to continue with execution of the first VR module or to select a new VR module for execution. If the analysis of the real-time feedback indicated that the user was actively engaging with the first VR module, dynamic VR coaching computing platform 110 may wait for execution of the first VR module to finish before generating (and sending) the fourth user interface.

If the analysis of the real-time feedback indicated that the user was not engaging with the first VR module, the fourth user interface may include alternative VR modules for the user to select from. These alternative VR modules may differ from the first set of VR modules provided to the user (in the third user interface) in terms of scenarios, the particular career/position explored in the VR module, or the like. Dynamic VR coaching computing platform 110 may first compare the original user profile generated for the user (i.e., based on data received from computer system 120 at steps 210 and 218) to the updated user profile (as discussed above, the original user profile may be updated based on the analysis of the real-time feedback received during execution of the first VR module). Based on this comparison, dynamic VR coaching computing platform 110 may identify that one or more characteristics for the user have changed. For example, the initial user profile may have indicated that the user was interested in a client-facing sales position. However, based on the real-time feedback received during execution of the first VR module that included such a client-facing sales position, dynamic VR coaching computing platform 110 may determine that the user's skills are better suited for a management position. Accordingly, dynamic VR coaching computing platform 110 may populate the fourth user interface with a series of management-oriented VR modules.

Figure 2J:
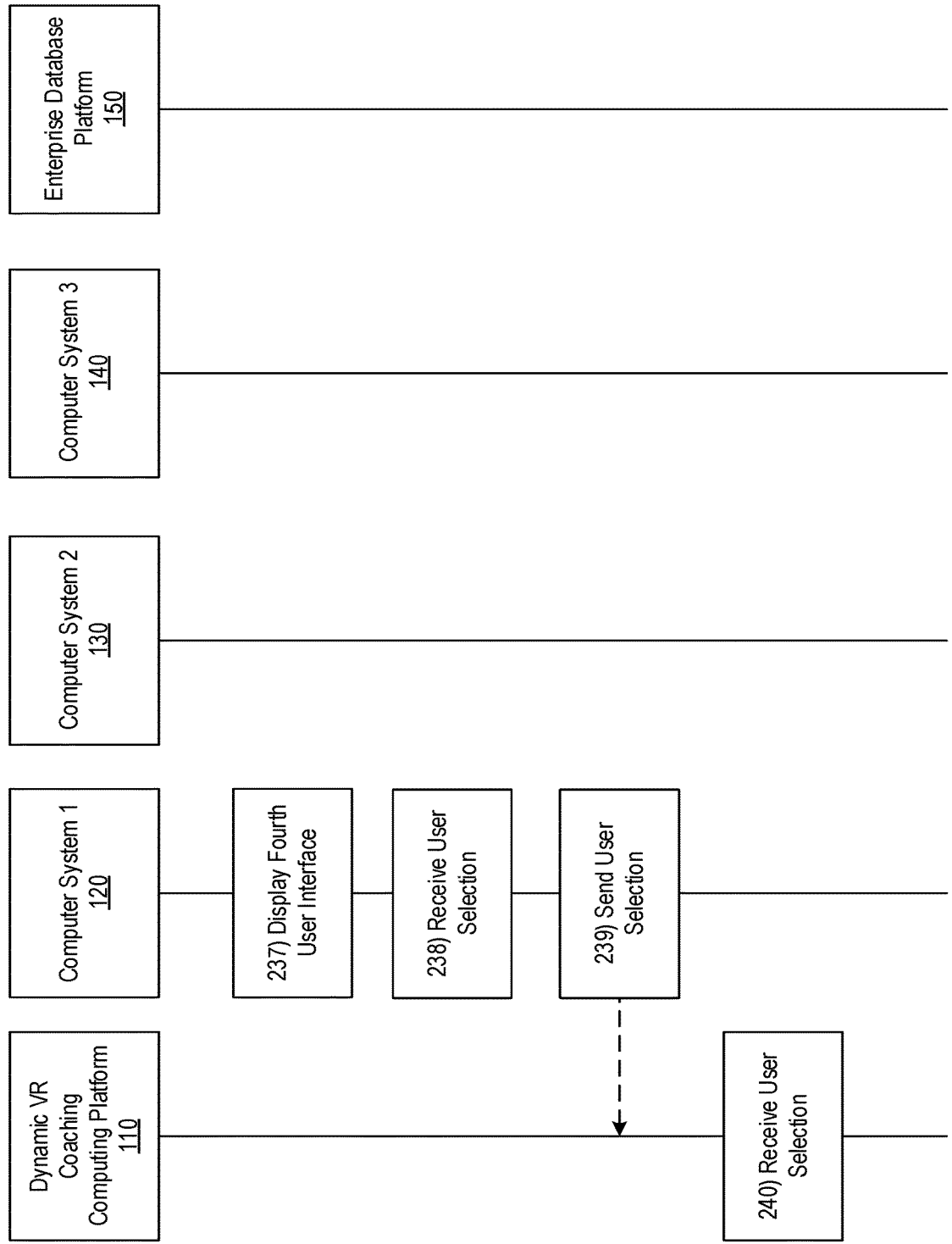

At step 236, dynamic VR coaching computing platform 110 may send the fourth user interface to computer system 120, wherein sending the fourth user interface to computer system 120 may cause computer system 120 to output the fourth user interface for display. Specifically, at step 236, computer system 120 may receive the fourth user interface from dynamic VR coaching computing platform 110. Referring to FIG. 2J, at step 237, computer system 120 may output the fourth user interface to the display device of computer system 120. In response to outputting the fourth user interface for display, computer system 120 may receive, at step 238, one or more user selections via the fourth user interface. The one or more user selections may identify one or more VR modules selected by the user interface from the VR modules listed in the fourth user interface. At step 239, computer system 120 may send the one or more user selections to dynamic VR coaching computing platform 110. At step 240, dynamic VR coaching computing platform 110 may receive the one or more user selections from computer system 120.

Referring to FIG. 2K, at step 241, dynamic VR coaching computing platform 110 may configure a second VR module. If the user selections received at step 240 only identified a single VR module, dynamic VR coaching computing platform 110 may configure the single-identified VR module. If multiple VR modules were identified by the user selections received by dynamic VR coaching computing platform 110 at step 240, dynamic VR coaching computing platform 110 may select one of the multiple VR modules for configuration. For example, the user selections received by dynamic VR coaching computing platform 110 may include a ranking for each selected VR module. Dynamic VR coaching computing platform 110 may use these rankings to identify the highest-ranked VR module for configuration. If no ranking is provided in the user selections received by dynamic VR coaching computing platform 110, dynamic VR coaching computing platform 110 may select a second VR module by determining, based on the user profile, which of the multiple VR modules is most relevant to the user.

Configuring the second VR module may include selecting among multiple options available for the second VR module. For example, the specific scenarios to be presented in the second VR module, the role of the user within the second VR module, the responsibilities of the user within the second VR module, the physical environment to be used within the second VR module, the characteristics of the actors within the second VR module (such as age, gender, appearance), the simulations to be included in the second VR module, etc. may all be customized by the dynamic VR coaching computing platform 110 based on user selections and/or the user profile. At step 242, once the second VR module has been configured, dynamic VR coaching computing platform 110 may send the second VR module to computer system 120. The sending of the second VR module from dynamic VR coaching computing platform 110 to computer system 120 may cause computer system 120 to execute the second VR module.

Specifically, at step 243, computer system 120 may execute the second VR module in response to receiving the second VR module from dynamic VR coaching computing platform 110. Execution of the second VR module by computer system 120 may result in the video display of the second VR module on the display device of computer system 120, accompanied by the outputting of the corresponding audio.

During execution of the second VR module by computer system 120, computer system 120 may generate, at step 244, real-time feedback. Similar to the discussion above with reference to the first VR module, the real-time feedback during execution of the second VR module may be generated based on one or more user inputs at computer system 120, words spoken by the user during execution of the second VR module, the physical movements of the user during execution of the second VR module, the facial expressions of the user during execution of the second VR module, or the like.

Referring to FIG. 2L, at step 245, computer system 120 may send the feedback generated during execution of the second VR module to dynamic VR coaching computing platform 110 via the feedback loop. Computer system 120 may send the feedback to dynamic VR coaching computing platform 110 in real-time (i.e., as it is generated by computer system 120) or at predetermined time intervals. Computer system 120 may continue generating the real-time feedback and sending the real-time feedback to dynamic VR coaching computing platform 110 via the feedback loop throughout the execution of the second VR module. At step 246, dynamic VR coaching computing platform 110 may receive the real-time feedback generated and sent by computer system 120. Dynamic VR coaching computing platform 110 may analyze the real-time feedback received at step 246 from computer system 120. For example, analysis the real-time feedback received by dynamic VR coaching computing platform 110 may indicate that the user is continuing to actively engage with the second VR module during its execution. Accordingly, once the execution of the second VR module is complete, dynamic VR coaching computing platform 110 may generate a fifth user interface. The fifth user interface is illustrated in FIG. 3D.

Referring to FIG. 3D, the fifth user interface 320 may include one or more recommendations for the user based on the user inputs during execution of the VR modules and based on the real-time feedback received from computer system 120 during execution of the VR modules. The recommendations may include career recommendations, job recommendations, VR module recommendations, training recommendations, or the like. A confidence score may also be calculated for each recommendation based on the user's performance in the VR modules and the real-time feedback generated for the user during execution of the VR modules. For example, if a recommendation is for a particular position, the confidence score may indicate how closely the user's qualifications match the qualifications required for the particular position.

In addition, the recommendations may include selectable links that direct the user to additional resources. For example, if dynamic VR coaching computing platform 110 determines, based on the user's performance in the VR modules and the real-time feedback received during the executions of the VR modules, that the user is well-suited for a particular position, the link, when selected by the user, may direct the user to a job application for the position. In another example, if dynamic VR coaching computing platform 110 determined that one or more training modules are to be recommended for the user, the link, when selected by the user, may direct the user to the training modules. Referring back to FIG. 2L, at step 248, dynamic VR coaching computing platform 110 may send the fifth user interface to computer system 120, wherein sending the fifth user interface to computer system 120 may cause computer system 120 to output the fifth user interface for display.

Specifically, referring to FIG. 2M, at step 249, computer system 120 may receive the fifth user interface from computer system 120. In response to receiving the fifth user interface, computer system 120 may output the fifth user interface for display on its display device. At step 251, dynamic VR coaching computing platform 110 may update the VR coaching model based on the real-time feedback received during execution of the VR modules. For example, if the user actively engaged with all of the VR modules, dynamic VR coaching computing platform 110 may update the VR coaching model to indicate that the skills, qualities, qualifications, and education levels associated with the user are a desirable match to the selected VR modules. Accordingly, in the future, the VR coaching model would recommend the same or similar VR modules for other users with similar skills, qualities, qualifications, and/or education levels, thereby improving the user experience for other users.

Although only two iterations for selecting VR modules, executing the VR modules, analyzing the real-time feedback, and selecting new VR modules is shown in FIGS. 2A-2M, greater or fewer iterations could be provided for a user. For example, the process may continue to repeat until dynamic VR coaching computing platform 110 determines that the user has found a VR module that they are actively engaging with. In another example, dynamic VR coaching computing platform 110 may repeatedly provide new VR module recommendations to the user for as long as the user continues to actively engage with the recommended VR modules.

At step 252, dynamic VR coaching computing platform 110 may process VR requests from computing system 120 and/or other systems, such as computer system 130 and/or computer system 140. In one example, these requests may be similar to those discussed above with respect to steps 204-250. In other example, dynamic VR coaching computing platform 110 may process a request from computer system 120, computer system 130, or computer system 140 associated with its VR coaching model and/or its user profiles. For example, dynamic VR coaching computing platform 110 may receive a request from computer system 130 for candidate recommendations for a particular position. Dynamic VR coaching computing platform 110 may input information associated with the position into the VR coaching model (which, as discussed above, may store the user profiles). In response, the VR coaching model may identify, based on their user profiles and the job description, one or more candidates that are well-suited for the position. Dynamic VR coaching platform 110 may send data identifying the one or more candidates to computer system 130.

Figure 4A:
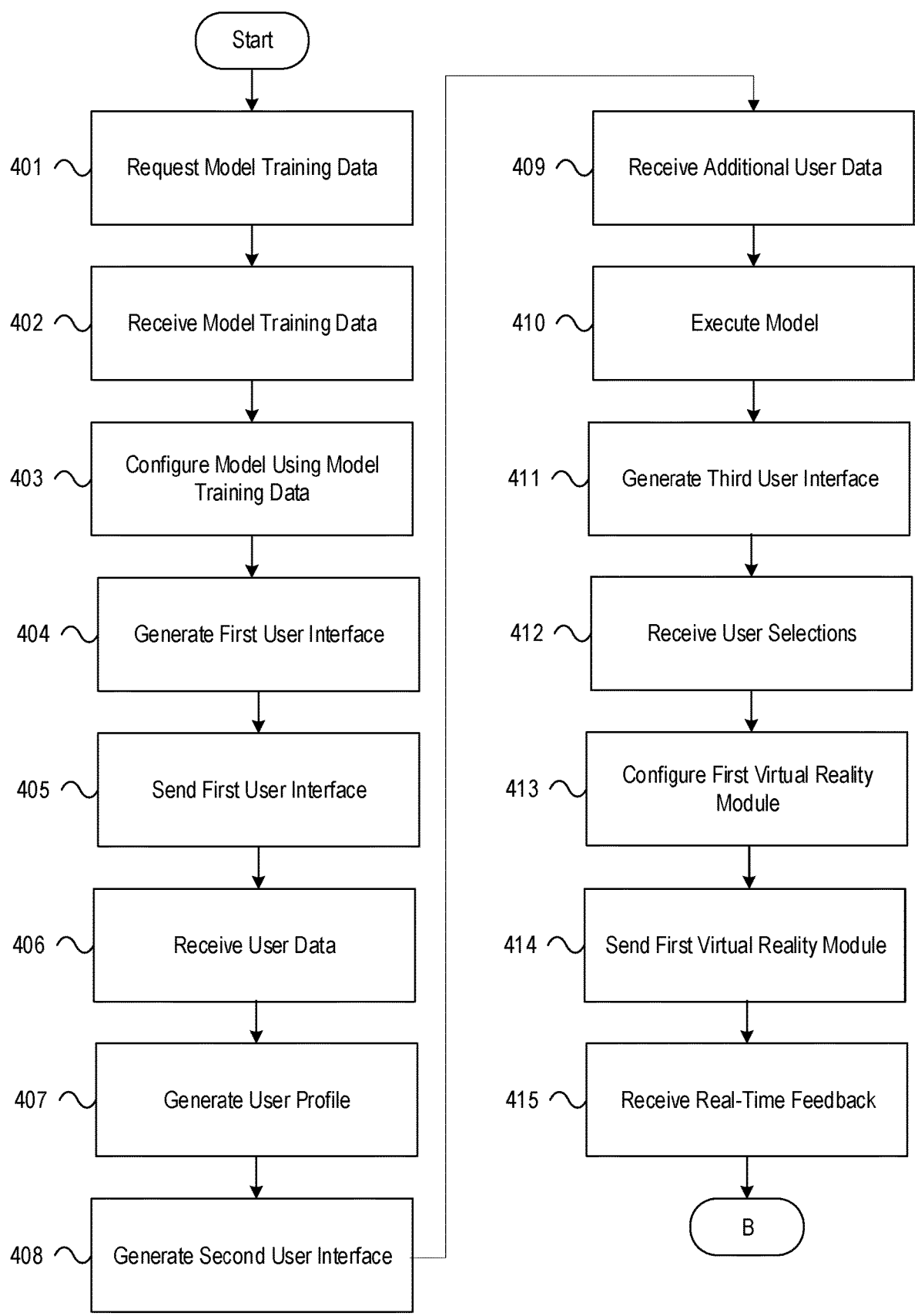
FIGS. 4A-4B depict an illustrative method for implementing a dynamic virtual reality coaching computing platform in accordance with one or more example embodiments.
Figure 4B:
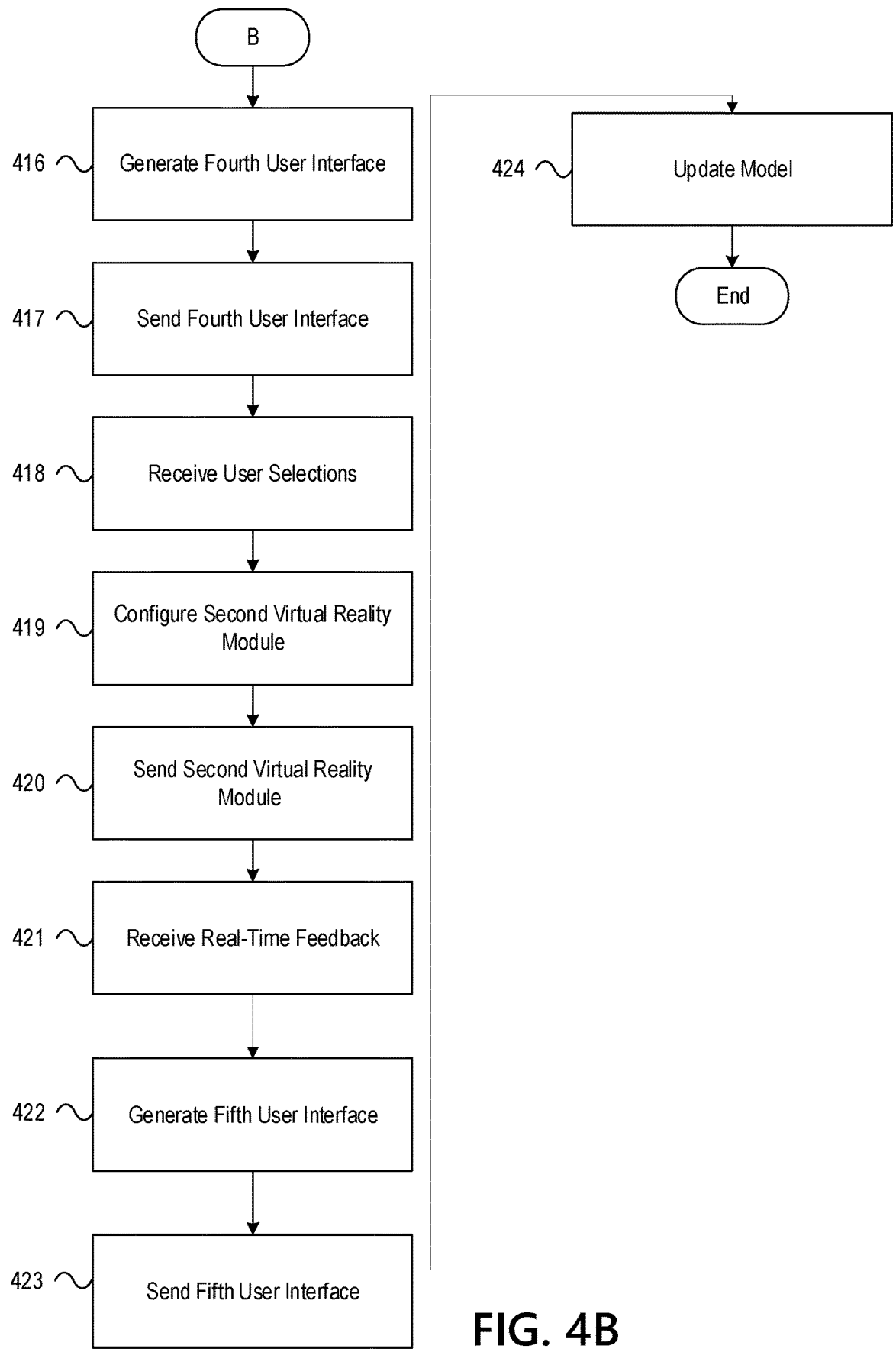

FIGS. 4A and 4B depicts an illustrative method for implementing a dynamic VR coaching computing platform in accordance with one or more example embodiments. Referring to FIG. 4A, at step 401, a computing platform having at least one processor, a communication interface, and memory may request model training data from one or more computer systems. At step 402, the computing platform may receive the requested model training data from the one or more computer systems. At step 403, the computing platform may configure a VR coaching model using the model training data. The computing platform may process the model training data prior to configuring the VR coaching model. At step 404, the computing platform may generate a first user interface comprising one or requested data fields. At step 405, the computing platform may send the first user interface to a first computer system, wherein sending the first user interface to the first computer system causes the first computer system to display the first user interface.

At step 406, the computing platform may receive user data from the first computer system in response to sending the first user interface. At step 407, the computing platform may generate a user profile based on the user data. At step 408, the computing platform may generate a second user interface comprising requests for additional user data. The computing platform may send the second user interface to the first computer system, wherein sending the second user interface to the first computer system causes the first computer system to display the second user interface. At step 409, the computing platform may receive the additional user data from the first computer system in response to sending the second user interface to the first computer system. The computing platform may update the user profile with the additional user data received from the first computer system.

At step 410, the computing platform may execute the VR coaching model by inputting user-specific parameters. At step 411, the computing platform may generate a third user interface that includes a listing of multiple VR modules. The listing of the multiple VR modules may be based on one or more outputs received from the VR coaching model. The computing platform may send the third user interface to the first computer system, wherein sending the third user interface to the first computer system causes the first computer system to display the third user interface.

At step 412, the computing platform may receive one or more user-selected VR modules from the first computer system in response to sending the third user interface to the first computer system. At step 413, the computing platform may configure a first VR module of the user-selected VR modules. The computing platform may select the first VR module for configuration based on user-provided rankings for the user-selected VR modules. At step 414, the computing platform may send the first VR module to the first computer system, wherein sending the first VR module to the first computer system causes the first computer system to execute the first VR module. At step 415, the computing platform may receive, from the first computer system, real-time feedback generated by the first computer system during execution of the first VR module.

Referring to FIG. 4B, at step 416, the computing platform may generate a fourth user interface based on an analysis of the real-time feedback. The fourth user interface may provide the user with the option to continue with execution of the first VR module or to select a new VR module for execution. At step 417, the computing platform may send the fourth user interface to the first computer system, wherein sending the fourth user interface to the first computer system causes the first computer system to display the fourth user interface. At step 418, the computer platform may receive one or more user selections identifying one or more user-selected VR modules from the first computer system. At step 419, the computing platform may configure a second VR module based on the one or more user selections. At step 420, the computing platform may send the second VR module to the first computer system, wherein sending the second VR module to the first computer system causes the first computer system to execute the second VR module. At step 421, the computing platform may receive, from the first computer system, real-time feedback generated by the first computer system during execution of the second VR module. At step 422, the computing platform may generate a fifth user interface comprising one or more recommendations for the user. The computing platform may generate the one or more recommendations for the user based on the real-time feedback received during the executions of the VR modules. At step 423, the computing platform may send the fifth user interface to the first computer system, wherein sending the fifth user interface to the first computer system causes the first computer system to display the fifth user interface. At step 424, the computing platform may update the VR coaching model based on the real-time feedback received during the executions of the VR modules.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A dynamic virtual reality (VR) coaching computing platform comprising:
    at least one processor;

a communication interface communicatively coupled to the at least one processor; and memory storing computer-readable instructions that, when executed by the at least one processor, cause the dynamic VR coaching computing platform to:
receive, from a plurality of computer systems, model training data;
configure, based on the model training data, a model;
generate a first user interface directed to a user requesting coaching and configured to request information to generate a user profile for the user;
send the first user interface to a first computer system, wherein sending the first user interface to the first computer system causes the first computer system to display the first user interface;
receive, from the first computer system and via the first user interface, user data for the user;
generate, for the user and based on the user data received via the first user interface, the user profile;
configure, based on the user profile and a first one or more user selections received from the first computer system, a first virtual reality module;
send, to the first computer system, the first virtual reality module, wherein sending the first virtual reality module to the first computer system causes the first computer system to execute the first virtual reality module;
receive, from the first computer system, first real-time feedback associated with the first virtual reality module;
generate, based on the first real-time feedback, a second user interface;
send the second user interface to the first computer system, wherein sending the second user interface to the first computer system causes the first computer system to display the second user interface;
receive, from the first computer system, a second one or more user selections;
configure, based on the second one or more user selections and the user profile, a second virtual reality module;
send, to the first computer system, the second virtual reality module, wherein sending the second virtual reality module to the first computer system causes the first computer system to execute the second virtual reality module;
receive, from the first computer system, second real-time feedback associated with the second virtual reality module;
update the model based on the first real-time feedback and the second real-time feedback;
generate, based on the first real-time feedback and the second real-time feedback, a fifth user interface; and
send the fifth user interface to the first computer system, wherein the sending the fifth user interface causes the first computer system to display the fifth user interface, and wherein the fifth user interface comprises a plurality of user recommendations, a confidence score for each of the plurality of user recommendations, and a selectable link for an additional resource for each of the plurality of user recommendations determined based at least in part on an associated confidence score.

2. The dynamic VR coaching computing platform of claim 1, wherein the first one or more user selections are received from the first computer system in response to the dynamic VR coaching computing platform sending a third user interface to the first computer system, wherein the sending the third user interface causes the first computer system to display the third user interface.

3. The dynamic VR coaching computing platform of claim 2, wherein the second user interface comprises a first plurality of VR modules.

4. The dynamic VR coaching computing platform of claim 3, wherein the third user interface comprises a second plurality of VR modules.

5. The dynamic VR coaching computing platform of claim 1, wherein the first real-time feedback comprises a video recording of the user interacting with the first VR module.

6. The dynamic VR coaching computing platform of claim 1, wherein the first real-time feedback comprises an audio recording of the user interacting with the first VR module.

7. The dynamic VR coaching computing platform of claim 1, wherein the user data comprises an education level of the user.

8. A method comprising:
at a dynamic virtual reality (VR) coaching computing platform comprising at least one processor, a communication interface, and memory:
receiving, from a plurality of computer systems, model training data;
receiving, based on the model training data, a model;
generating a first user interface directed to a user requesting coaching and configured to request information to generate a user profile for the user;
sending the first user interface to a first computer system, wherein sending the first user interface to the first computer system causes the first computer system to display the first user interface;
receiving, from the first computer system and via the first user interface, user data for the user;
generating, for the user and based on the user data received via the first user interface, the user profile;
receiving, based on the user profile and a first one or more user selections received from the first computer system, a first virtual reality module;
sending, to the first computer system, the first virtual reality module, wherein sending the first virtual reality module to the first computer system causes the first computer system to execute the first virtual reality module;
receiving, from the first computer system, first real-time feedback associated with the first virtual reality module;
generating, based on the first real-time feedback, a second user interface;
sending the second user interface to the first computer system, wherein sending the second user interface to the first computer system causes the first computer system to display the second user interface;
receiving, from the first computer system, a second one or more user selections;
configuring, based on the second one or more user selections and the user profile, a second virtual reality module;
sending, to the first computer system, the second virtual reality module, wherein sending the second virtual reality module to the first computer system causes the first computer system to execute the second virtual reality module;

receiving, from the first computer system, second real-time feedback associated with the second virtual reality module;
updating the model based on the first real-time feedback and the second real-time feedback;
generating, based on the first real-time feedback and the second real-time feedback, a fifth user interface; and
sending the fifth user interface to the first computer system, wherein the sending the fifth user interface causes the first computer system to display the fifth user interface, and wherein the fifth user interface comprises a plurality of user recommendations, a confidence score for each of the plurality of user recommendations, and a selectable link for an additional resource for each of the plurality of user recommendations determined based at least in part on an associated confidence score.

9. The method of claim 8, wherein the first one or more user selections are received from the first computer system in response to the dynamic VR coaching computing platform sending a third user interface to the first computer system, wherein the sending the third user interface causes the first computer system to display the third user interface.

10. The method of claim 9, wherein the second user interface comprises a first plurality of VR modules.

11. The method of claim 10, wherein the third user interface comprises a second plurality of VR modules.

12. The method of claim 8, wherein the first real-time feedback comprises a video recording of the user interacting with the first VR module.

13. The method of claim 8, wherein the first real-time feedback comprises an audio recording of the user interacting with the first VR module.

14. The method of claim 8, wherein the user data comprises an education level of the user.

15. One or more non-transitory computer-readable media storing instructions that, when executed by a dynamic virtual reality (VR) coaching computing platform comprising at least one processor, a communication interface, and memory, cause the dynamic VR coaching computing platform to:
receive, from a plurality of computer systems, model training data;
configure, based on the model training data, a model;
generate a first user interface directed to a user requesting coaching and configured to request information to generate a user profile for the user;
send the first user interface to a first computer system, wherein sending the first user interface to the first computer system causes the first computer system to display the first user interface;
receive, from the first computer system and via the first user interface, user data for the user;
generate, for the user and based on the user data received via the first user interface, the user profile;
configure, based on the user profile and a first one or more user selections received from the first computer system, a first virtual reality module;
send, to the first computer system, the first virtual reality module, wherein sending the first virtual reality module to the first computer system causes the first computer system to execute the first virtual reality module;
receive, from the first computer system, first real-time feedback associated with the first virtual reality module;
generate, based on the first real-time feedback, a second user interface;
send the second user interface to the first computer system, wherein sending the second user interface to the first computer system causes the first computer system to display the second user interface;
receive, from the first computer system, a second one or more user selections;
configure, based on the second one or more user selections and the user profile, a second virtual reality module;
send, to the first computer system, the second virtual reality module, wherein sending the second virtual reality module to the first computer system causes the first computer system to execute the second virtual reality module;
receive, from the first computer system, second real-time feedback associated with the second virtual reality module; and
update the model based on the first real-time feedback and the second real-time feedback,
generate, based on the first real-time feedback and the second real-time feedback, a fifth user interface; and
send the fifth user interface to the first computer system, wherein the sending the fifth user interface causes the first computer system to display the fifth user interface, and wherein the fifth user interface comprises a plurality of user recommendations, a confidence score for each of the plurality of user recommendations, and a selectable link for an additional resource for each of the plurality of user recommendations determined based at least in part on an associated confidence score.

* * * * *